United States Patent [19]

Sawada et al.

[11] Patent Number: 5,933,675
[45] Date of Patent: *Aug. 3, 1999

[54] CENTRALIZED CONTROL SYSTEM FOR TERMINAL DEVICE

[75] Inventors: Yoji Sawada, Motosu; Toru Kirimura, Tsushima; Seiji Watanabe, Ogaki; Kazunobu Maekawa, Toyokawa; Sumiaki Hirata, Hoi, all of Japan

[73] Assignees: Sanyo Electric Col., Ltd.; Minolta Camera Kabushiki Kaisha, both of Osaka, Japan

[*] Notice: This patent is subject to a terminal disclaimer.

[21] Appl. No.: 08/783,119

[22] Filed: Jan. 14, 1997

Related U.S. Application Data

[63] Continuation of application No. 08/203,684, Feb. 28, 1994, Pat. No. 5,631,724, which is a continuation of application No. 07/905,065, Jun. 24, 1992, abandoned, which is a continuation of application No. 07/682,511, Apr. 8, 1991, abandoned.

[30] Foreign Application Priority Data

| Apr. 10, 1990 | [JP] | Japan | 2-95665 |
| Apr. 10, 1990 | [JP] | Japan | 2-95666 |
| Apr. 10, 1990 | [JP] | Japan | 2-95667 |

[51] Int. Cl.[6] ............................................. G03G 21/00
[52] U.S. Cl. ................................... 399/8; 399/10; 399/24
[58] Field of Search .................................. 399/8, 10, 24; 364/189, 185, 186; 379/106

[56] References Cited

U.S. PATENT DOCUMENTS

| 5,077,582 | 12/1991 | Kravette et al. | 399/8 |
| 5,282,127 | 1/1994 | Mii | 399/8 |
| 5,347,346 | 9/1994 | Shimizu et al. | 399/8 |
| 5,412,779 | 5/1995 | Motoyama | 399/8 |
| 5,631,724 | 5/1997 | Sawada et al. | 399/8 |

FOREIGN PATENT DOCUMENTS

| 57-125566 | 8/1982 | Japan . |
| 62-275947 | 11/1987 | Japan . |
| 64-26866 | 1/1989 | Japan . |
| 64-75339 | 3/1989 | Japan . |

*Primary Examiner*—William J. Royer
*Attorney, Agent, or Firm*—Darby & Darby

[57] ABSTRACT

A central control system that monitors and remotely controls one or more terminal devices which may be part of an apparatus such as an imaging machine. Each terminal device communicates with the central control system at a predetermined time and relays the operational conditions of the apparatus to which it is associated. Relayed conditions may include information such as the number of imaging operations performed in a period of time. The central control system controls each of the terminal devices in accordance with the information transmitted from each of the terminal devices. The central control system supervises incoming transmissions from the terminal devices and detects when a terminal device has not communicated at its predetermined time. When this condition arises, the identity of the non-reporting terminal, as well as the predetermined time it was to have contacted the central control system, are displayed at the central control system.

3 Claims, 22 Drawing Sheets

Fig. 7(a) DISCHARGE CODE

71 — COPY PAPER IS DISCHARGED AT FALLING EDGE OF $b_0$

Fig. 7(b) JAM, TROUBLE CODE

72

$b_7 = 0$, $b_6 = 0$ NORMAL
$b_7 = 1$, $b_6 = 0$ JAM $b_5$ TO $b_0$ INDICATE CODE
$b_7 = 1$, $b_6 = 1$ TROUBLE $b_5$ TO $b_0$ INDICATE CODE

Fig. 7(c) JAM, TROUBLE COUNTER

73 — COUNT NUMBER OF EACH ITEM IS INDICATED BY 16 BITS, ITEM NUMBER

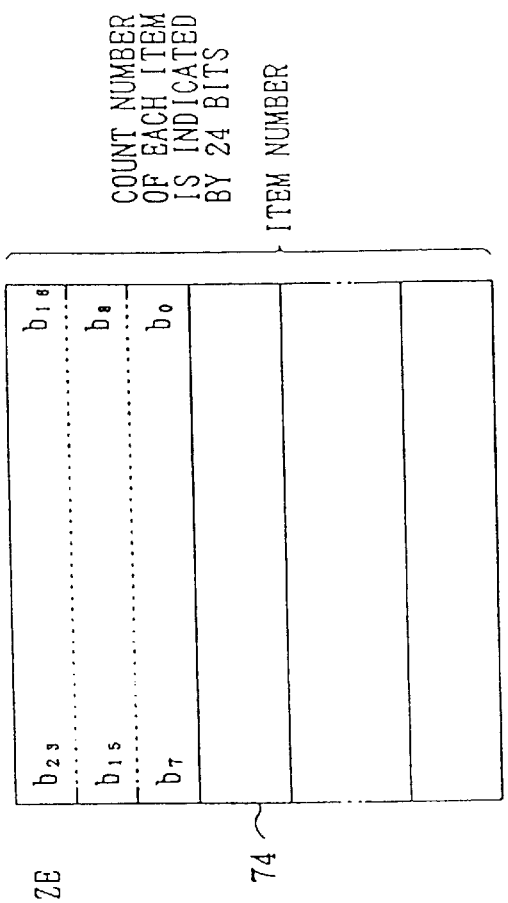
Fig. 7(d) COUNTER FOR EACH SIZE OF COPY PAPER
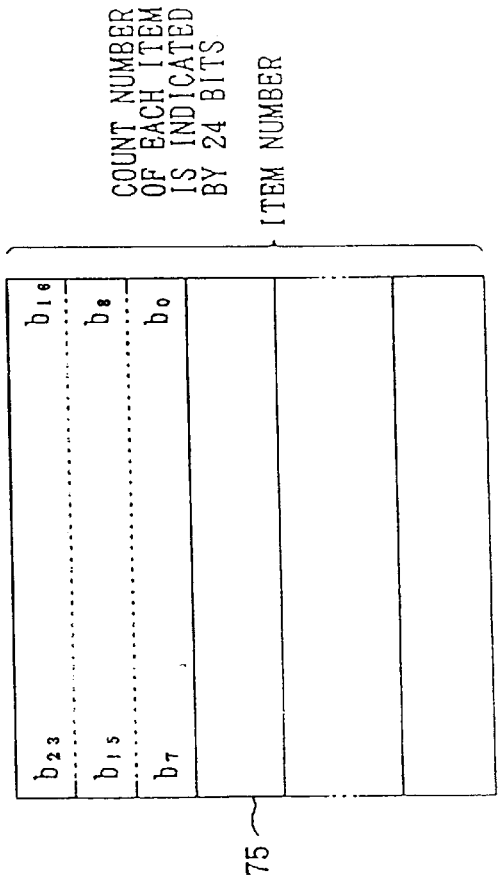
Fig. 7(e) PM COUNTER

| UNRECEIVED CONDITION | | TROUBLE 2 | UNRECEIVED 2 90.02.07/17:23 |

| 001 | DT ID: | 0002 | SCHEDULED TRANSMISSION TIME: 90.02.07/15:53 |
| --- | --- | --- | --- |
| | NAME: | SANYO DENKI KABUSHIKI KAISYA JOHO SHISUTEMU JIGYOHONBU KENKYU SENTA | |
| | ADD.: | 180, OMORI, ANPACHI-CHO, ANPACHI-GUN, GIFU-KEN | |
| | TEL.: | 058464-4844    TYPE: SFT-120 | |

| 002 | DT ID: | 0005 | SCHEDULED TRANSMISSION TIME: 90.02.07/16:00 |
| --- | --- | --- | --- |
| | NAME: | SANYO DENKI TOKKI KABUSHIKI KAISYA | |
| | ADD.: | 1-1-10, UENO, TAITO-KU, TOKYO-TO | |
| | TEL.: | 03-837-6321    TYPE: EP-8600 | |

*Fig. 18*

CENTRALIZED CONTROL SYSTEM FOR TERMINAL DEVICE

This is a continuation of application Ser. No. 8/203,684, filed Feb. 28, 1994, now U.S. Pat. No. 5,631,724, which was a continuation of Ser. No. 07/905,065 filed Jun. 24, 1992, now abandoned, which was a continuation of Ser. No. 07/682,511 filed Apr. 8, 1991, now abandoned.

BACKGROUND OF THE INVENTION

1. Field of the Invention

The present invention relates to a centralized control system for terminal devices capable of controlling an image forming apparatus such as a copying machine, facsimile, and laser beam printer, and further a terminal devices such as automatic vendor with the use of communication lines from a remote place.

2. Description of the Related Art

An image forming apparatus such as a copying machine requires maintenance and inspection including replacement of photoreceptors and toner so as to remain in good condition. A specialized service company is in charge of these management of the apparatus, together with management of rental fee for the apparatus. The service company sends a service person regularly or in the case where the copying machine is out of order. However, an increase in the number of copying machines with the spreading use thereof, and also an increase in the number of inspection items with the copying machine becoming more multi-function will lead to an increasing burden on the service company. In view of this, there exists a growing need for a labor-saving system capable of centrally and remotely controlling a plurality of the copying machines by a central unit.

These circumstances are similar to those for an automatic vendor, such as the one for drinks or cigarettes. A specialized vendor company is in charge of sales management and maintenance and inspection for the automatic vendor. Accordingly, there exists a growing need for a system capable of centrally and remotely controlling a plurality of automatic vendors by a central unit.

A system for management of a plurality of copying machines is disclosed in U.S. Pat. No. 4,583,834. In the disclosed system, various operating data of the copying machine such as a total number of copies, machine malfunctions and amounts of remaining copy sheets and toner transmitted to a computer through a communication network. The computer processes the transmitted data and feeds back to the copying machine instructions.

A centralized control system in which data of copying machines are transmitted from respective data terminal devices to a central unit through a communication network is proposed by the inventors. In this proposed system, communication between each data terminal device and the central unit is achieved at a fixed transmission time.

Nevertheless, in the proposed centralized control system as described above, in the case where the central unit is unable to receive the information at the fixed transmission time due to abnormality in the data terminal device, abnormality in connection of the communication line or the like, the central unit is incapable of confirming that it has been unable to receive the information. As a result, such a problem will arise that the abnormality in the data terminal device or in the connection of the communication line cannot be detected at an early stage.

Further, in the case where the proposed centralized control system as described above is adopted for controlling the copying machine, the following problem may arise. Since the power supply for the data terminal device is generally fed from the copying machine, in the case where the power supply for the data terminal device is shut off because the copying machine is not in use at the fixed transmission time, the data terminal device cannot transmit the data at the fixed transmission time.

Especially, in recent years, in the case where copying operations are not executed over a predetermined period of time, most types of copying machines have the power supply thereof automatically shut off to save the power. Accordingly, there is a likelihood that the above problem may frequently arise. These circumstances are also similar to those for the automatic vendor. Especially, since nighttime sales of alcoholic beverages by the use of the automatic vendor is frequently regulated by an ordinance, the power supply for the automatic vendor is often shut off at night.

Accordingly, in the proposed centralized control system, in the case where the information to be transmitted at the fixed transmission time is not transmitted to the central unit, the central unit cannot collect the necessary data with certainty. As a result, such a problem may arise that the controlling function of the central unit may not be fully utilized.

SUMMARY OF THE INVENTION

The present invention has overcome the above drawbacks and has an object of providing a centralized control system for terminal device, which is capable of detecting an abnormality in communicating means provided for each terminal device or in a communication line at an early stage since, when there exists a terminal device which has not transmitted information to a central unit when past the fixed transmission time, the information specifying the terminal device is displayed, thereby enabling identification of the terminal device not having executed its fixed time transmission.

It is another object of the present invention to provide a centralized control system for terminal device in which power supply for a memory disposed at the data terminal device and an IC for clocking the present time is backed up so as to store the information to be transmitted at the fixed transmission time. Accordingly, even in the case where the fixed time transmission has been unable to be executed because the power supply for the terminal device is shut off at the transmission time, when the power is supplied again, the stored information to be transmitted at the fixed transmission time is transmitted with certainty by comparing the backed up present time with the transmission time. Thereby, controlling function of the central unit becomes reinforced.

It is further another object of the present invention to provide a centralized control system for an image forming apparatus in which it is determined that the image forming apparatus has recovered from a trouble condition, such as jamming, to a normal condition by judging whether a sheet of paper is actually discharged from the apparatus, thus preventing trouble recovery transmission from being unnecessarily executed repeatedly for the same trouble.

The centralized control system for terminal device according to the present, invention, has one or more terminal devices, communicating means provided for each terminal device for transmitting each information relating to operational condition of each terminal device at a predetermined time, control means connected to each communicating means through a communication line and adopted for controlling each terminal device in accordance with the information transmitted from each terminal device, wherein the control means comprises supervising means for supervising the information transmission by each communicating means at the predetermined time, detecting means for detecting the communicating means not executing the information transmission at the predetermined time as a result of supervisory, and displaying means for displaying the information identifying the communicating means detected by the detecting means.

With the above construction, the information transmission from each communicating means at the fixed transmission time is normally supervised by the control means. As a result, when the communicating means not executing the information transmission even past the fixed transmission time is detected, the identification information of the very communicating means is displayed. Accordingly, abnormality in the communicating means provided for each terminal device or in connection of the communication line can be detected at an early stage.

Further, the centralized control device according to the present invention has one or more terminal devices, communicating means provided for each terminal device for transmitting each information relating to operational condition of each terminal device when the power is supplied, control means connected to each communicating means through the communication line for controlling the terminal device in accordance with the information transmitted from each communicating means, wherein the communicating means comprises storing means for storing the information, holding means for holding the information at the predetermined time, clocking means for clocking the present time, a back-up power source for backing up the storing means and the time clocking means when the power supply is shut off, transmitting means for, in the case where the information cannot be transmitted since the power supply is shut off at the predetermined time, transmitting information to be transmitted at the predetermined time, which is stored in the storing means, when the power is supplied again in accordance with the present time clocked by the clocking means and the data held by the holding means at the predetermined time.

With the above construction, in the case where the power supply for the terminal device is shut off, the data to be transmitted at the predetermined time is held rather than erased. Further, in the case where the power supply is shut off at the predetermined time, the present time and the predetermined time are compared with each other at the time when the power is supplied again. In the case where tie predetermined time has already passed, the information which should have been transmitted at the predetermined time is transmitted to the control means.

Moreover, the centralized control system for the image forming apparatus according to the present invention has one or more image forming apparatuses for forming an image on a paper, communicating means provided for each image forming apparatus for transmitting information relating to operational condition of the image forming apparatus, such as trouble information, control means for controlling the image forming apparatus in accordance with the information transmitted from the communicating means, wherein the communicating means comprises a first judging means for judging the trouble condition of the image forming apparatus in accordance with the trouble information, a second judging means for judging whether the paper is discharged from the image forming apparatus, and a third judging means for judging that the image forming apparatus has recorded from the trouble condition to the normal condition in accordance with judgment results by the first and second judging means.

With the above construction, in the case where the image forming apparatus is in trouble condition, the first judging means determines that the image forming apparatus is in trouble condition in accordance with the trouble information. In addition, in the case where it is determined that the image forming apparatus is in trouble condition by the first judging means, when the second judging means determines that the paper is discharged from the image forming apparatus, the third judging means determines that the image forming apparatus has recovered from the trouble condition to the normal condition.

The above and further objects and features of the invention will more fully by apparent from the following detailed description with accompanying drawings.

BRIEF DESCRIPTION OF THE DRAWINGS

FIG. 7 comprising FIGS. 7(a) through 7(e), is a diagram showing an example of configuration of count data, FIG. 8 comprising

FIG. 9 comprising

FIG. 12 comprising

FIG. 18 is a diagram showing an example of a display screen displaying unreceived conditions.

DESCRIPTION OF THE PREFERRED EMBODIMENTS

Hereinafter, the present invention will be described with reference to drawings showing the embodiments thereof.

Figure 1:
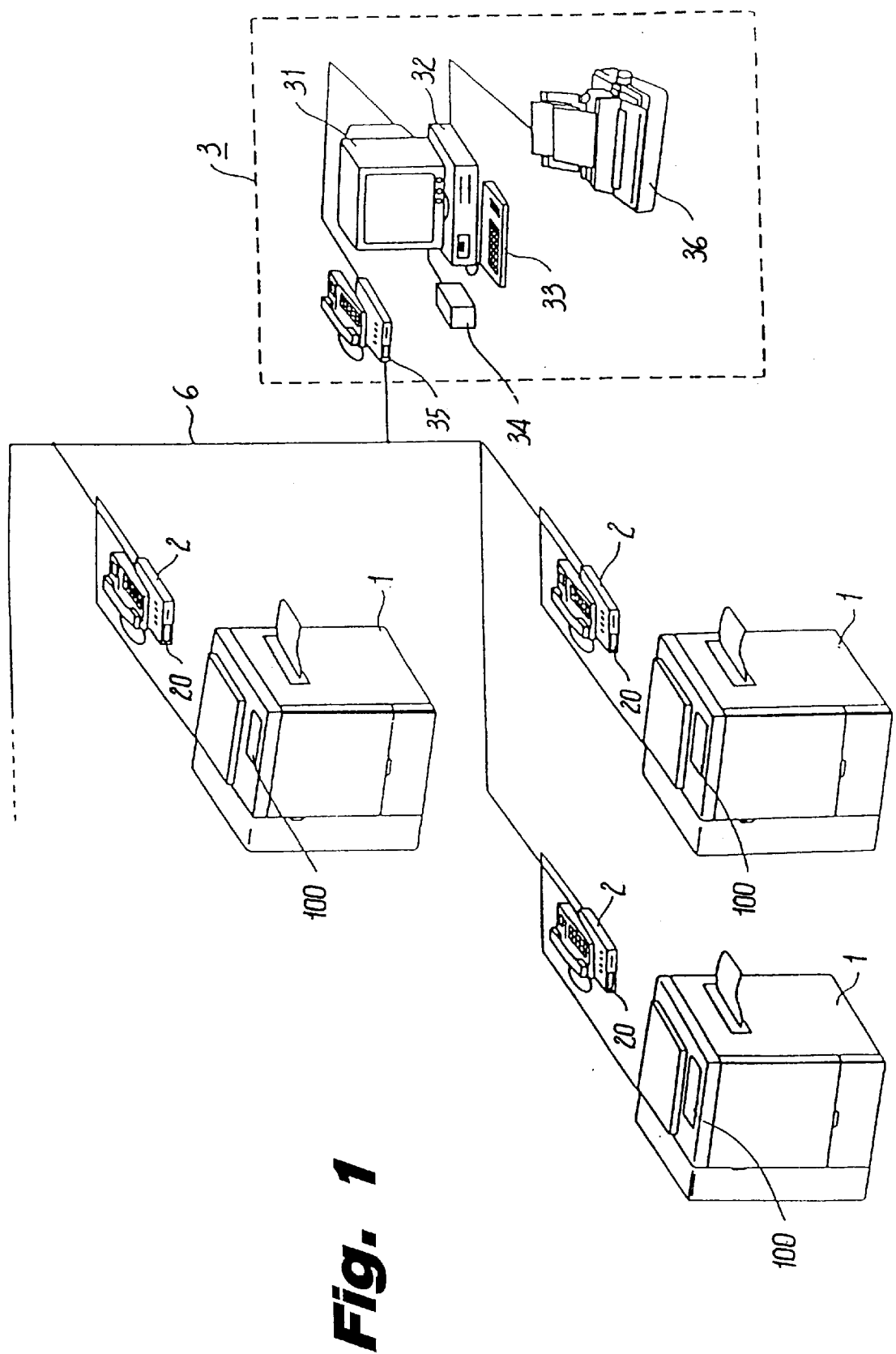
FIG. 1 is a diagram showing an explanatory system configuration of an entire centralized control system for terminal device according to the present invention.
Figure 2:
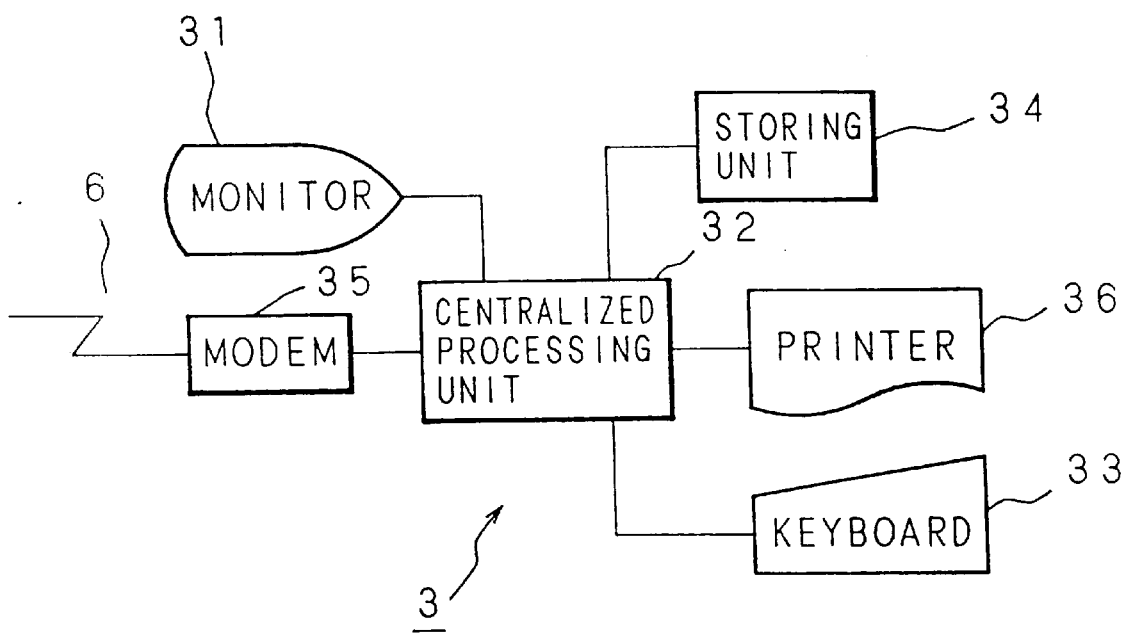
FIG. 2 is a block diagram showing an explanatory construction of a central unit of the centralized control system for terminal device.

FIG. 1 is a diagram showing an explanatory system configuration of an entire centralized control system for terminal device according to the present invention. FIG. 2 is a block diagram showing an explanatory construction of a central unit of the centralized control system.

In the present embodiment, a copying machine which is an image forming apparatus is employed as a terminal device in a system configuration.

Each of a plurality of copying machines 1 are provided with a data terminal device 2 as modem integrated communicating means. Each of the copying machines 1 are adopted for transmitting data to the data terminal device 2 through a first serial interface (hereinafter referred to as I/F) 11 and a second serial I/F 12 to be described below (see FIG. 3). Also, on top surface of each of the copying machine 1 is disposed a control panel 100 adopted for instructing a copying operation or the like.

The data terminal device 2 collects data including operational condition of the copying machine 1 and transmits the data to centralized control means, or a central unit 3 through communication line 6. In addition, the data terminal device 2 comprises an operation unit 20 for performing operations, such as initializing a mode.

The central unit 3 comprises a monitor 31, a centralized processing unit 32, a keyboard 33, a storing unit 34, a modem 35, and a printer 36. In the central unit 3 are performed the following operations. First, data received through the communication line 6 is inputted through the modem 35 to the centralized processing unit 32, which is a personal computer in this embodiment. After being processed in the centralized processing unit 32, the specified data is automatically or manually by the use of keyboard 33 outputted to the monitor 31 or the printer 36. In this embodiment, a CRT display is used as a monitor. The centralized processing unit 32 is connected to the storing unit 34 including an auxiliary memory, such as a ROM, RAM, or hard disk. In the storing unit 34 are stored a program for the centralized processing unit 32 and data to be processed therein.

Figure 3:
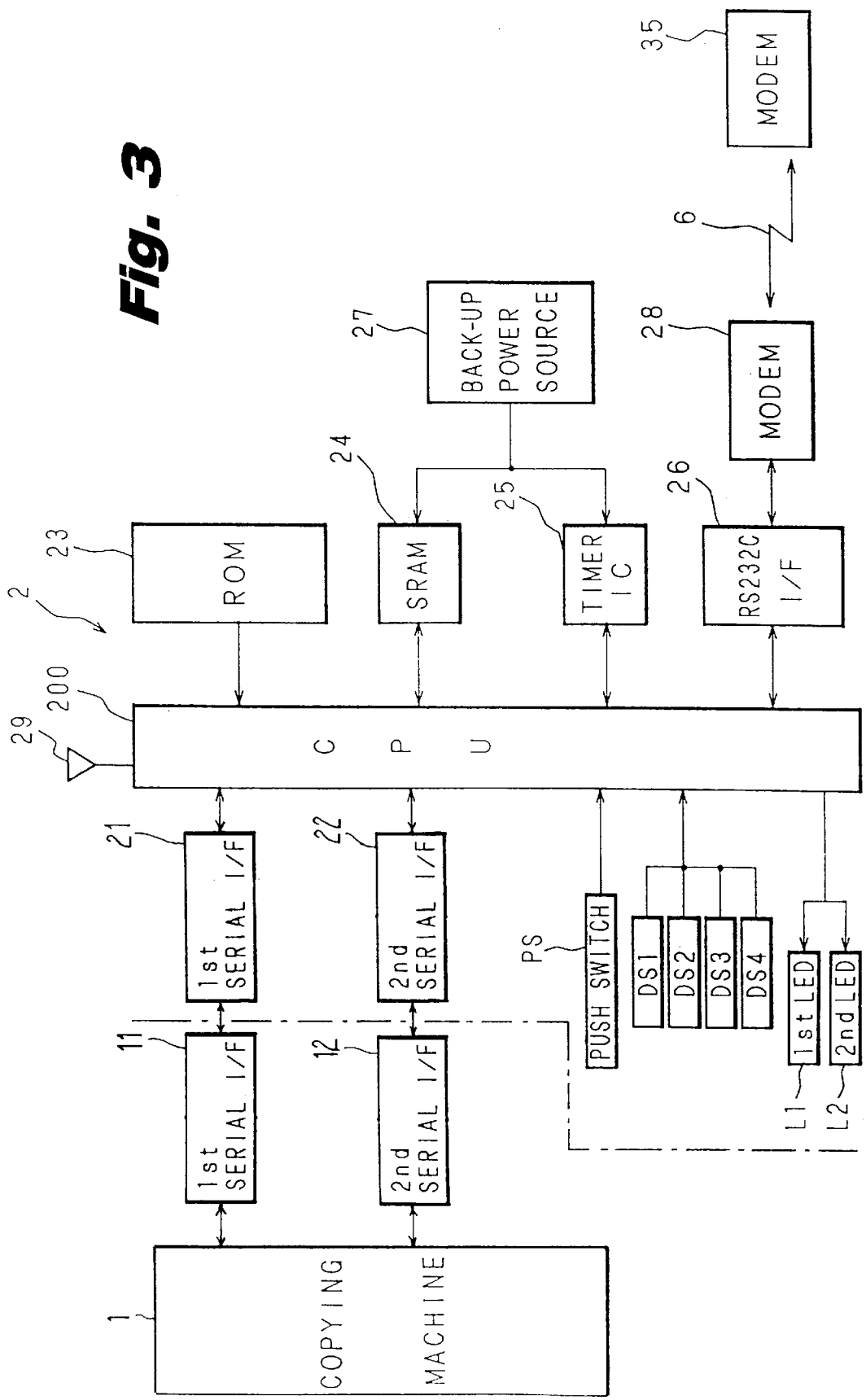
FIG. 3 is a block diagram showing an explanatory construction of a data terminal device.

FIG. 3 is a block diagram showing an explanatory construction of the data terminal device 2.

The data terminal device 2 has a CPU 200 actuatable when a power source 29 is mounted thereto and executable various data processings. The power source 29 is commonly used by the copying machine 1 and turned on or off by a switch, not shown.

Various data transmitted through the first and second serial I/Fs 11 and 12 of the copying machine 1 is given to the CPU 200 through a first serial I/F 21 and a second serial I/F 22 on the data terminal device 2 side. The first serial I/Fs 11, 21 deal with data, such as information relating to set mode and operational condition of the copying machine 1, and various count data. On the other hand, the second serial I/Fs 12, 22 deal with element data, such as image forming conditions including voltages applied for developing bias and exposure.

The count data and element data read into the CPU 200 through the first serial I/Fs 11, 21 and the second serial I/Fs 12, 22 are stored in a static RAM (hereinafter referred to as SRAM) 24. Also, initialization data including telephone number and identification number (hereinafter referred to as ID number) of the central unit 3 and ID number of the data terminal device 2 are stored in the SRAM 24 at the time of initialization by the use of the operation unit 20 and the control panel 100. Further, the SRAM 24 is, together with a timer IC 25, backed up by a back-up power source 27, and various stored data remains to be stored therein without volatiling even when the power supply is shut off.

Figure 4:
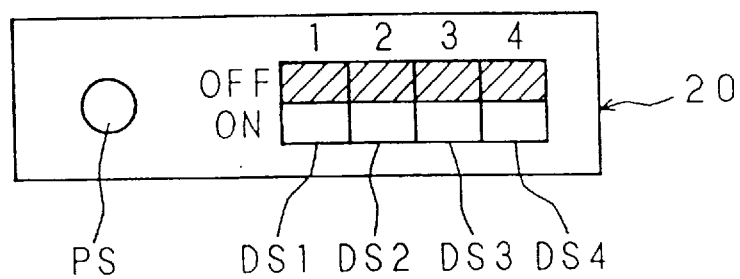
FIG. 4 is a diagram showing an explanatory configuration of an operation unit of the data terminal device.

FIG. 4 is a diagram showing an explanatory configuration of the operation unit 20 of the data terminal device 2.

On the front surface of the data terminal device 2 is disposed four dip switches, DS1, DS2, DS3, DS4, and a push switch PS. The dip switch DS4 is a switch for entering an initialization mode, and the dip switches, DS1, DS2, DS3, are switches for designating respectively set modes of the telephone number and ID number of the central unit 3, and of the ID number of the data terminal device 2. The push switch PS is a switch for manually transmitting the data. These switches, PS, DS1, DS2, DS3, DS4 are connected to the CPU 200.

In the time of setting each mode, numerical values are inputted with the use of the control panel 100 disposed on the copying machine 1.

Figure 5:
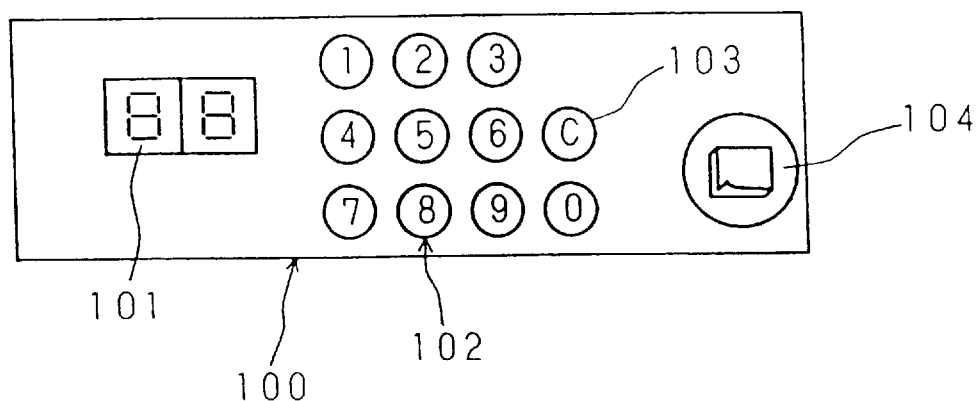
FIG. 5 is a diagram showing an explanatory configuration of a control panel.

FIG. 5 is a diagram showing an explanatory configuration of the control panel 100.

On the control panel 100 are disposed a display unit 101 for displaying a two-digit numerical value by 7 segment display, a ten key 102 for inputting numerical values, a clear key 103 and a print key 104.

Also, the CPU 200 has a first LED L1 and a second LED L2 connected thereto. The first LED L1 is lighted on when the data terminal device 2 is initialized, and lighted on and off when initialization of the data terminal device 2 is properly completed. However, when the initialization of the data terminal device 2 is not properly completed, the first LED L1 is not lighted on. The second LED L2 is lighted on when the data terminal device 2 and the central unit 3 communicate with each other. The second LED L2 is lighted on and off when the communication between the data terminal device 2 and the central unit 3 is properly completed, and lighted off when the communication is not properly completed.

Various data stored in the SRAM 24 are transmitted through an RS-232C I/F 26 to the communication line 6 by a modem 28, and read into the central unit 3 through the modem 35 thereof.

Next, there will be described operation of the centralized control system for terminal device, according to the present invention, constructed in such a manner as described above.

Figure 6:
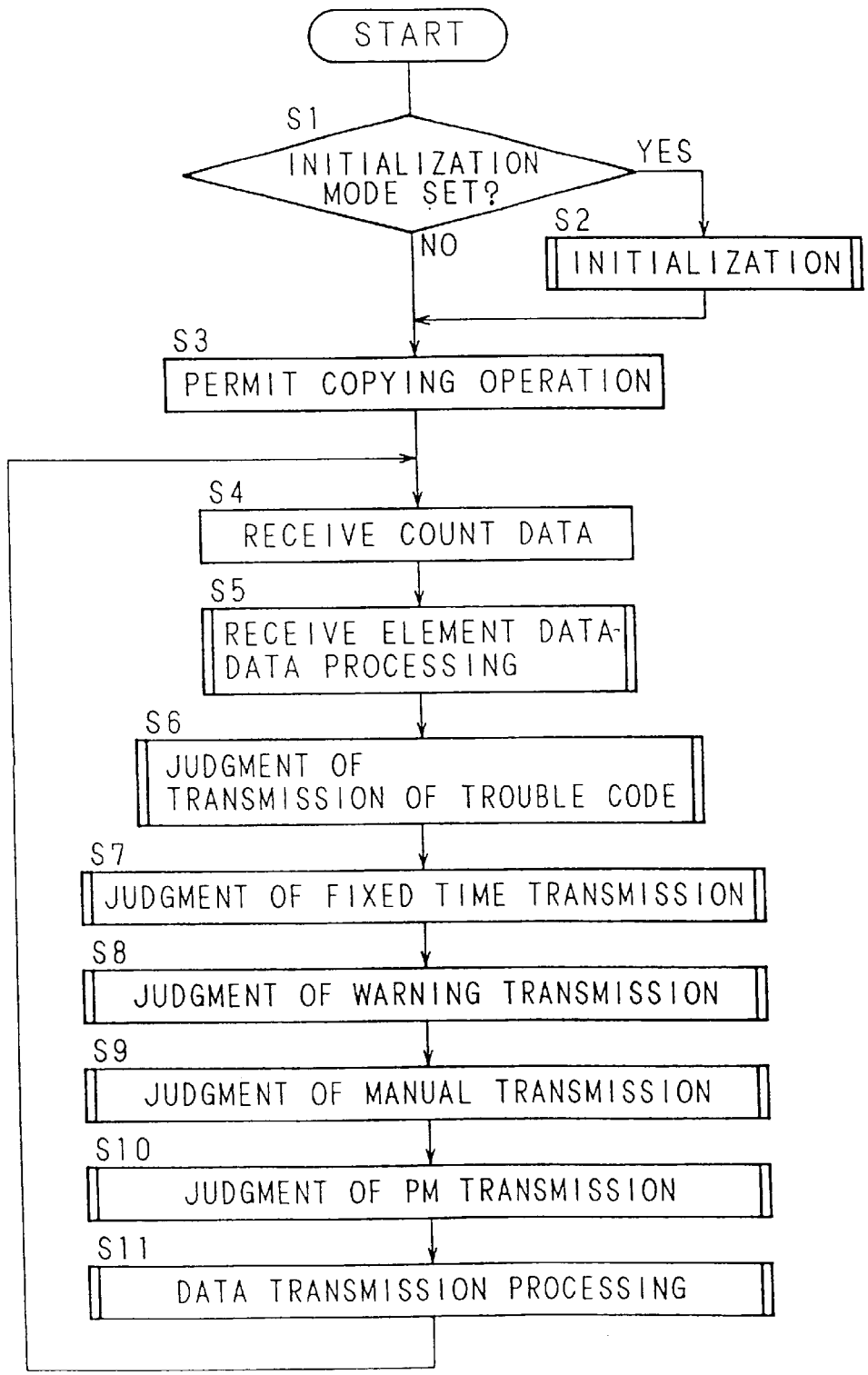
FIG. 6 is a flow chart showing operational procedure in a main routine of the data terminal device.

FIG. 6 is a flow chart of operation procedure in the main routine of the data terminal device 2.

Before the flow chart shown in FIG. 6 is described, there will be explained definitions of terms, "on edge" and "off edge" used in explaining each flow chart hereinafter.

"On-edge" is referred to such a change of state that state of switches, sensors, signals or the like are turned from off to on.

"Off-edge" is referred to such a change of state that state of switches, sensors, signals or the like are turned from on to off.

When the power is supplied, the data terminal device 2 first judges whether the initialization mode is set depending on whether the dip switch DS5 is in ON or OFF state in Step S1. In the case where the dip switch DS4 is in ON state, the data terminal device 2 enters under the initialization mode to implement initialization in Step S2. On the other hand, in the case where the dip switch DS4 is in OFF state, that is, either in the case where initialization mode is not set, or is completed, the data terminal device 2 sends a copying operation enable signal through the first serial I/Fs 21, 11 to the copying machine 1 so as to permit the copying machine 1 to perform copying operation in Step S3.

Upon receiving the copying operation enable signal, the copying machine 1 transmits count data each time completing one cycle of the copying operation. The data terminal device 2 receives the count data transmitted through the first serial I/Fs 11, 21 from the copying machine 1 in Step S4. Contents of the count data include a discharge code, JAM trouble code, JAM trouble counter, counters provided for each size of copy paper, and counters used by respective parts (hereinafter referred to as PM counter) of the copying machine 1. The data terminal device 2 renews the value into an updated one and holds the renewed value each time receiving these count data.

FIG. 7 is a diagram showing an example of configuration of the count data.

The discharge code 71 is data of 1 byte (8 bits) indicating that a sheet of copy paper is discharged from the copying machine 1. The discharging of the copy paper is indicated by the fall of the least significant bit $b_0$.

The JAM trouble code 72 is data of 1 byte indicating condition of the copying machine 1. The most significant bit $b_7=0$ indicates that the copying machine 1 is in normal condition. Also, the most significant bit $b_7=1$ and a bit $b_6=0$ indicate that the copying machine 1 is in a jamming (JAM) condition. Further, the most significant bit $b_6=1$ indicate that the copying machine 1 is in trouble condition. In this case, the cause of the JAM trouble is indicated by bits $b_5$ through $b_0$.

The JAM trouble counter 73 indicates a count value in 16 bits every item, or cause of trouble. Similarly, the counters 74 provided for each size of copy paper and the PM counter 75 indicate count values in 24 bits every item, or copy paper size and part respectively.

Upon receiving the count data, the data terminal device 2 receives the element data transmitted through the second serial I/Fs 12, 22 each time a sheet of copy paper is discharged from the copying machine 1. The data terminal device 2 applies data processings to the received element data to be described below in Step S5. The element data are representative of image forming conditions, such as voltages applied for developing bias and exposure as described above. These element data are indicated in numerical values of 8 bits (256 levels).

Next, the data terminal device 2 judges whether a trouble code has been transmitted in according with the trouble flag set depending on the state of JAM trouble code 72 in Step S6. Subsequently, the data terminal device 2 judges whether data has been transmitted at fixed transmission time in accordance with a fixed time transmission flag set by the central unit 3 and indicative of whether the fixed transmission time has already passed in Step S7.

Next, the data terminal device 2 judges whether a warning has been transmitted depending on the state of a warning transmission flag set in the case where the element data exceeds either an upper or lower limit threshold, or in the case where the JAM trouble counter 73 or PM counter exceeds count thresholds in Step S8. Subsequently, the data terminal device 2 judges whether the data is manually transmitted in Step S9.

The manual transmission judgment is executed in accordance with a manual transmission flag set by actuating at a normal time the push switch PS used in the case where the initialization transmission is executed at the time of initialization. The transmitted data is same as the data transmitted in the time of the trouble transmission and the warning transmission.

Further, the data terminal device 2 executes PM code transmission judgment in accordance with the PM transmission flag set in the case where certain part is replaced because the PM counter 75 has reached the count threshold in Step S10. Consequently, the data terminal device 2 transmits the necessary data through the modems 28 and 35 to the central unit 3 in accordance with the above judgment results in Step S11.

Next, there will be described each processing routine.

Figure 8A:
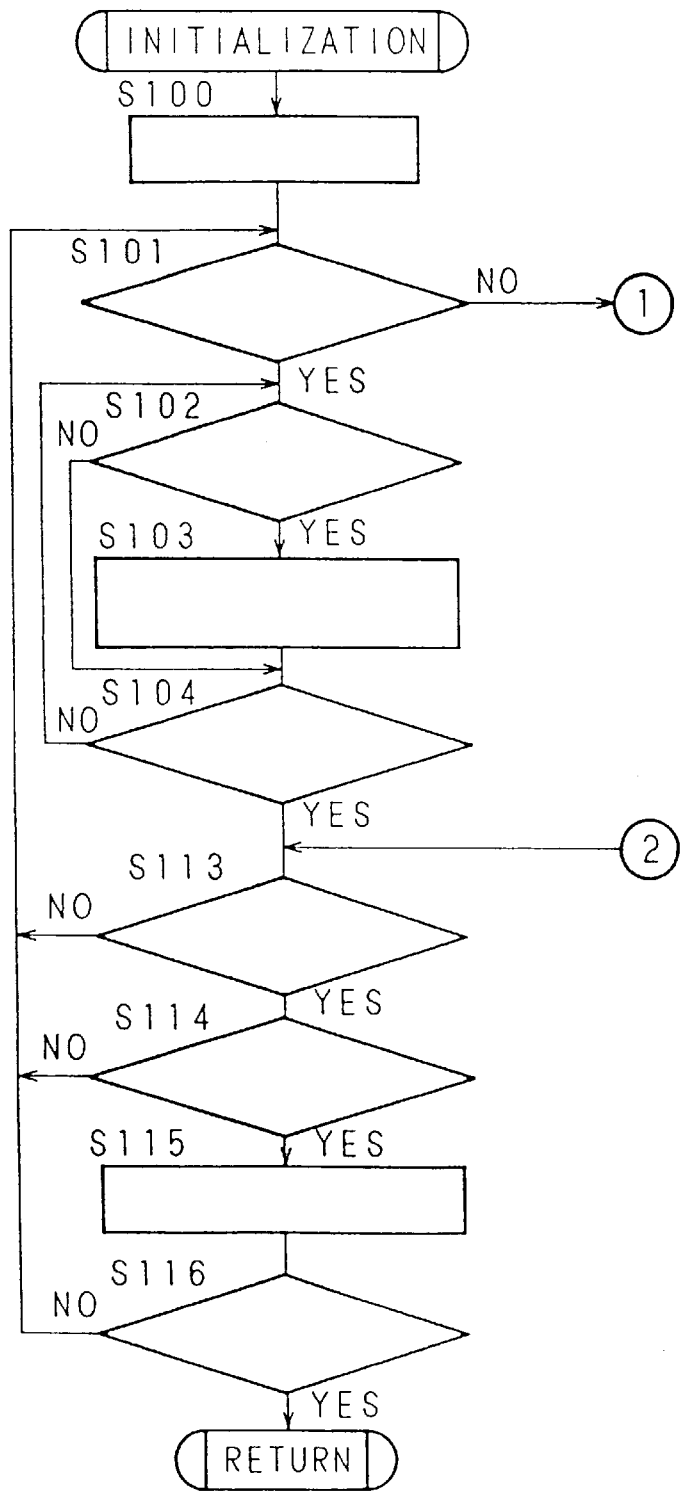
FIGS. 8(a) and 8(b) is a flow chart showing procedure in an initialization processing routine of the data terminal device.
Figure 8B:
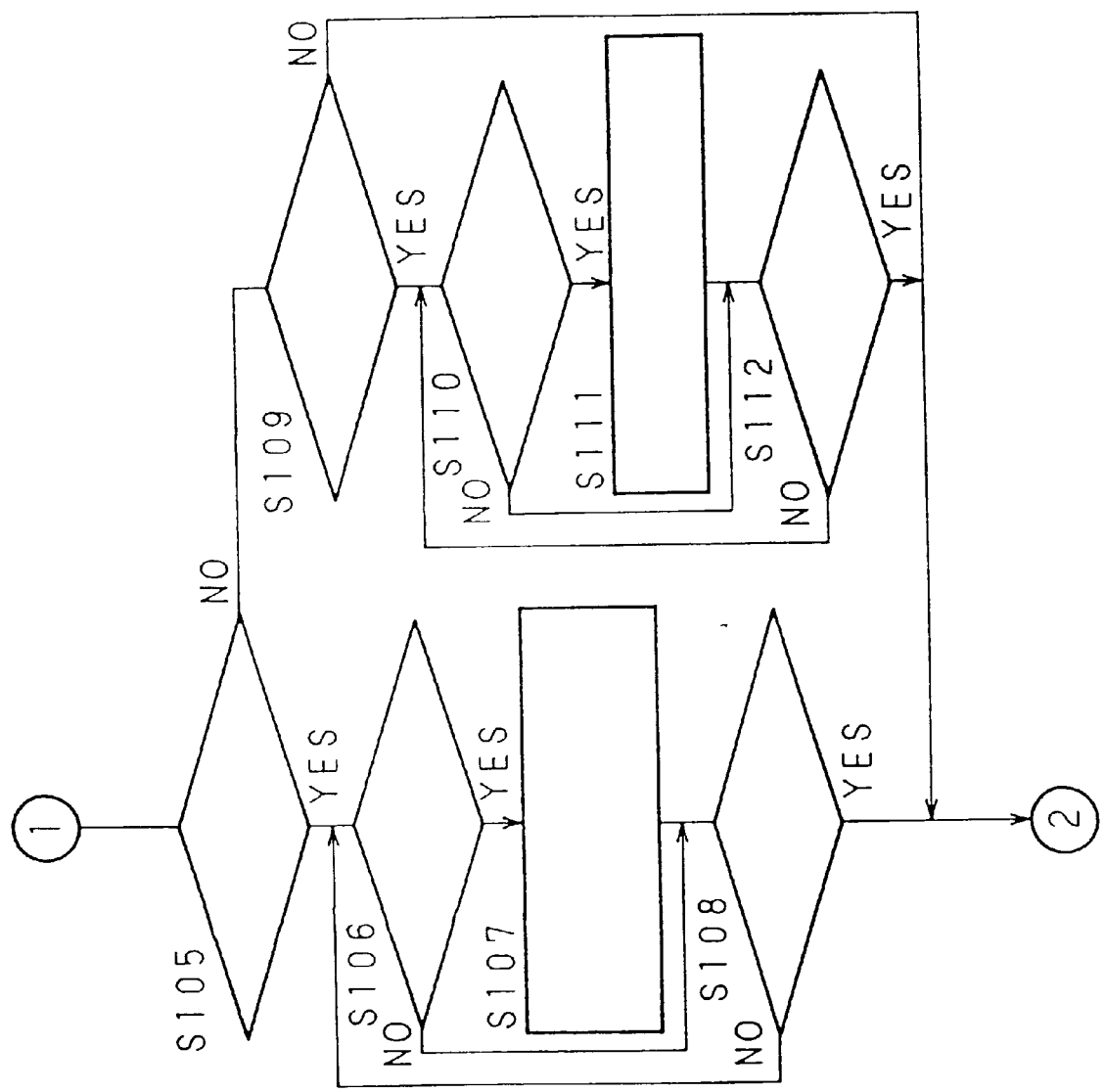

FIG. 8 is a flow chart showing procedure of an initialization processing routine of the data terminal device 2.

First, SRAM 24 is initialized in Step S100, and on-edge of the dip switch DS1 is judged in Step S101. When the on-edge of the dip switch DS1 is detected, this routine enters a telephone number input mode under which the telephone number of the central unit 3 is inputted.

Under the telephone number input mode, the on-edge of the print key 104 is judged in Step S102. In the case where the on-edge of the print key 104 is detected, the first-ranked number out of numbers inputted through the use of the ten key 102 and displayed on the display unit 101 is read into and registered as a telephone number of the central unit 3 in Step S103. These Steps S102 and S103 are repeated by the number of inputted telephone numbers. Upon detecting the off-edge of the dip switch DS1 in Step 104, the telephone number input mode ends.

On the other hand, in the case where the on-edge of the dip switch DS1 is not detected in Step S101, this routine proceeds to Step S105 in which the on-edge of the dip switch DS2 is judged. In the case where the on-edge of the dip switch DS2 is detected, the on-edge of the print key 104 is judged in Step S106. In the case where the on-edge of the print key 104 is detected, the first-ranked number out of numbers inputted through the use of the ten key 102 and displayed on the display unit 101 is read into the registered as an ID number of the central unit 3 in Step S107. These Steps S106 and S107 are repeated by the number of the inputted numbers. Consequently, the ID number input mode for the central unit 3 ends upon detecting the off-edge of the dip switch DS2.

On the other hand, in the case where the on-edge of the dip switch DS2 is not detected in Step S105, this routine proceeds to Step S109 in which the on-edge of the dip switch DS3 is judged. In the case where the on-edge of the dip switch DS3 is detected, the on-edge of the print key 104 is judged in Step S110. In the case where the on-edge of the print key 104 is detected, the first-ranked number out of numbers inputted through the use of the ten key 102 and displayed on the display unit 101 is read into and registered as an ID number for the data terminal device 2 in Step 111. These Steps S110 and S111 are repeated by the number of the inputted numbers. Consequently, the ID number input mode for the data terminal device 2 ends upon detecting the off-edge of the dip switch DS3 in Step 112.

Upon completion of each mode, it is judged whether mode setting is completed depending upon whether the data is inputted under each mode in Step 113. In the case where the mode setting has not been completed yet, this routine returns to S101. On the contrary, in the case where the mode setting has been completed, the on-edge of the push switch PS is detected in Step 114. Synchronized with the timing of detection of the on-edge of the push switch PS, initialization data is transmitted the central unit 3 through the modems 28 and 35. In addition, in the data terminal device 2 are received a closing date, fixed transmission time and various thresholds used for warning judgment preset in the central unit 3 to total the count data in Step S115.

Consequently, when it is determined that communication between the data terminal device 2 and the central unit 3 has been normally completed in Step S116, the initialization processing routine returns to the main routine. When the communication between the data terminal device 2 and the central unit 3 is not normally completed due to the fact that the central unit 3 is engaged or that communication trouble has arisen, the initialization processing routine recycles to Step S101 and waits for the on-edge of the push switch PS again in Step 114.

Figure 9A:
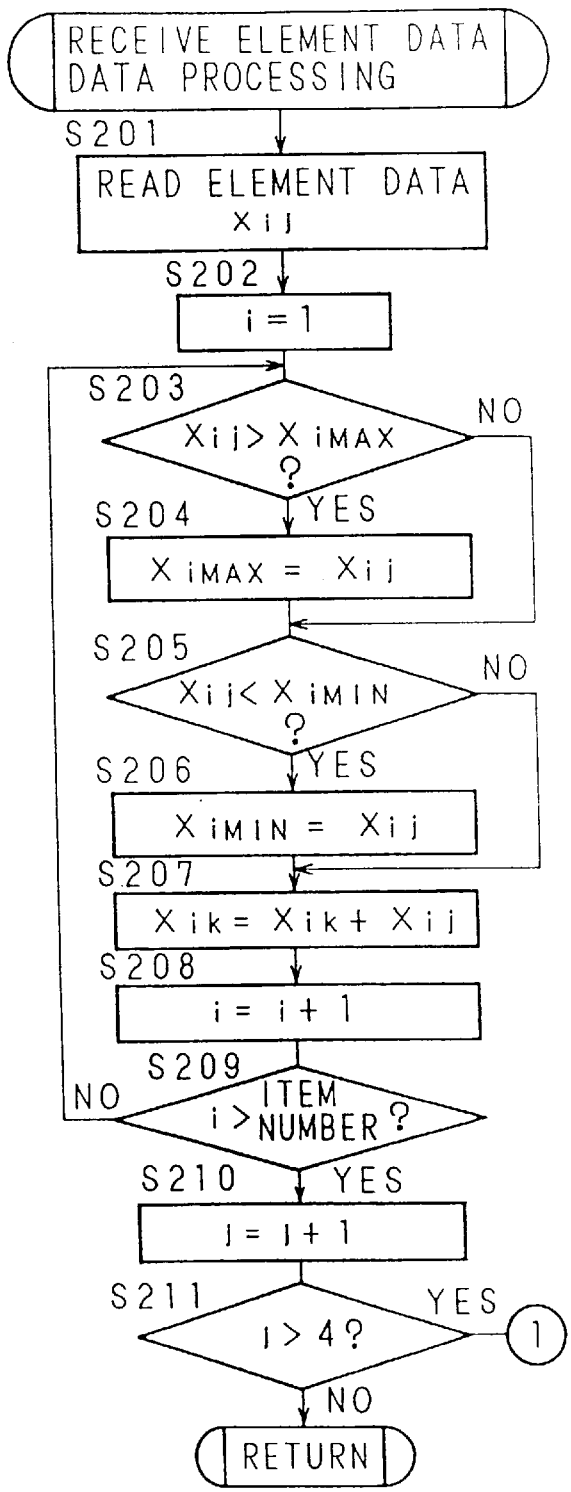
FIGS. 9(a) through 9(c) is a flow chart showing procedure in an element data receiving/data processing routine in the data terminal device.
Figure 9B:
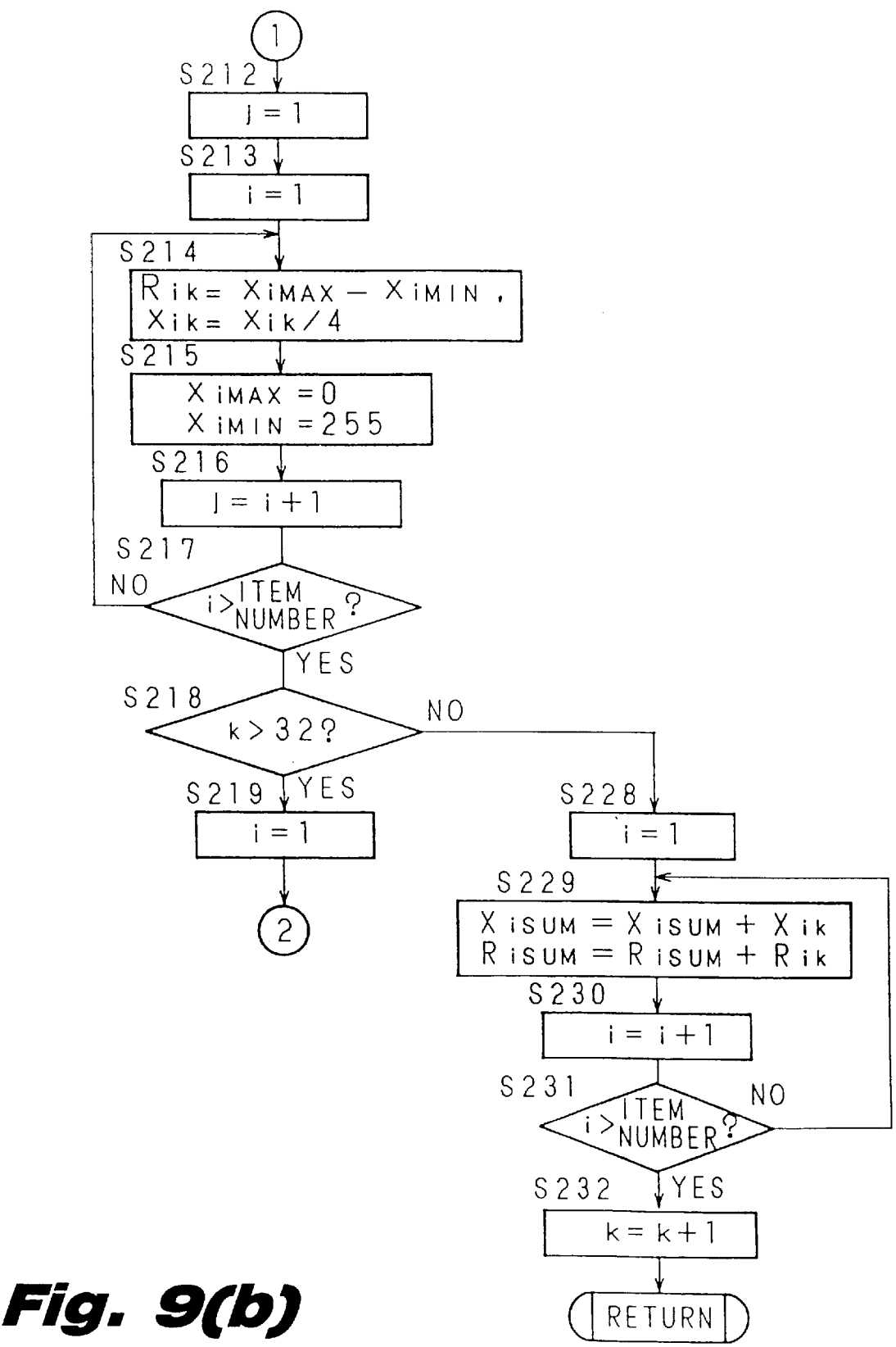
Figure 9C:
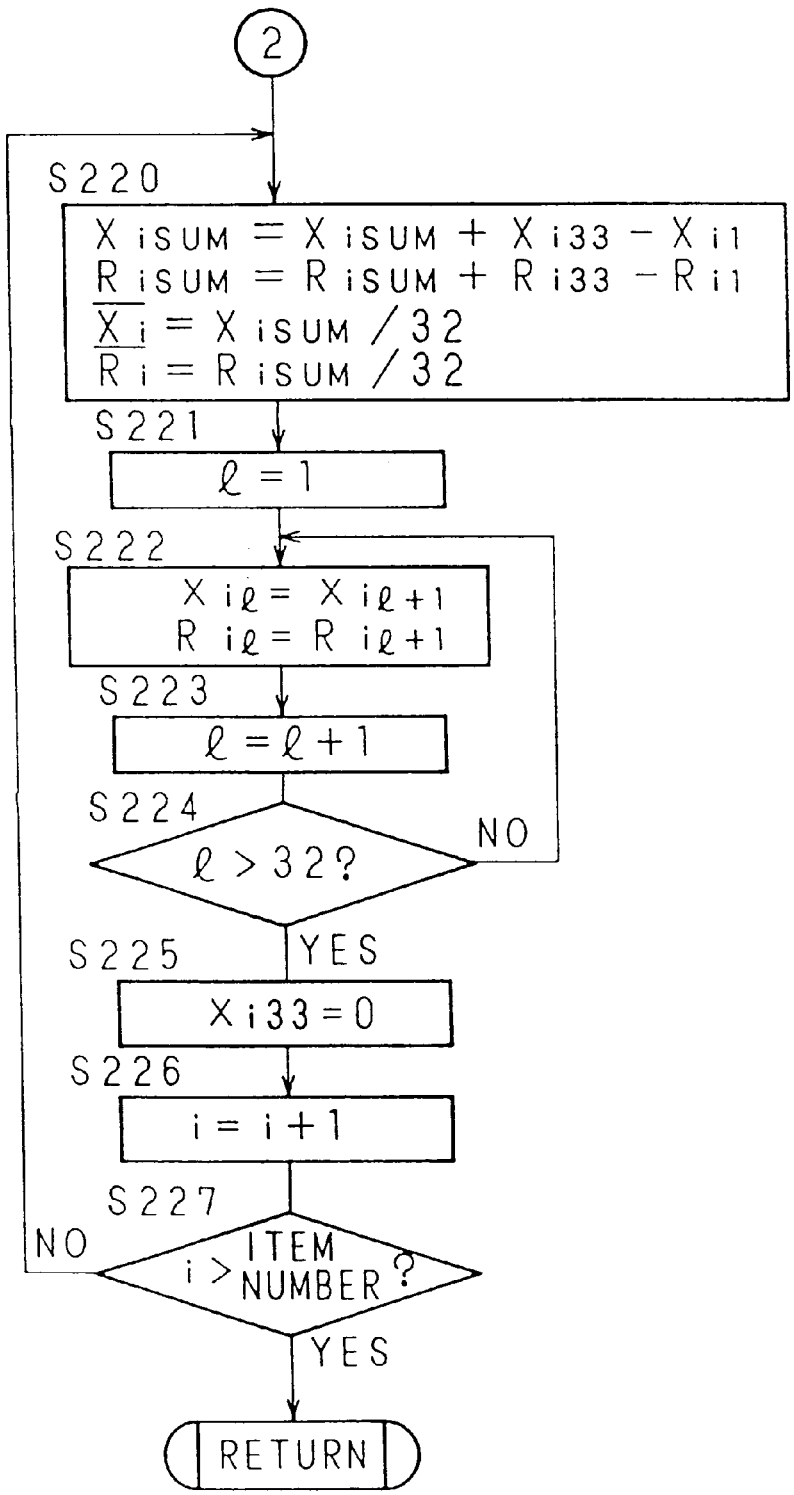

FIG. 9 is a flow chart showing procedure of the element data receiving/data processing routine executed in Step 5.

First, in step S201, the element data $x_{ij}$ (i: data number) of 8 bits transmitted through the second serial I/Fs 12 and 22 is read in each time at a sheet of copy paper is discharged from the copying machine 1. Next, the data number i is set to 1 in Step S202. Then, it is judged whether $X_{ij}$ is greater than the maximum element data $X_{iMAX}$ in Step S203. In the case where the $X_{ij}$ is greater than $X_{iMAX}$, then the $X_{ij}$ is set to be the maximum element data in Step S204. In the case where the $X_{ij}$ is not greater than the $X_{iMAX}$, this routine proceeds to S205 in which it is judged whether the $X_{ij}$ is smaller than the minimum element data $x_{iMIN}$. In the case where the $X_{ij}$ is smaller than the $X_{iMIN}$, the $X_{ij}$ is set to be the minimum element data $X_{iMIN}$ in Step 206. Then, in Step S207, the added value is obtained by adding the $X_{ij}$ to the $X_{ik}$. Subsequently, the data number i is incremented one in Step S208, and it is judged whether the data number i is greater than the item number in Step 209. In the case where the data number i is not greater than the item number, this routine returns to step S203. In the case where the data number i is greater than the item number, this routine proceeds to Step S210 in which the number j is increased by one. Subsequently, it is judged whether the number j is greater than 4 in Step S211. In the case where the number j is not greater than 4, this routine recycles to Step S203. On the contrary, in the case where the number j is greater than 4, this routine proceeds to Step S212. In the above procedure, four of each maximum element data $X_{iMAX}$, minimum element data $X_{iMIN}$, added value are obtained for each item.

In Steps S212 and S213, the number j and the data number i are respectively set to 1. Then, in Step S214, a range $R_{ik}$ is obtained by using the following equation;

$$R_{ik}=X_{iMAX}-X_{iMIN},$$

and a mean $X_{ik}$ is obtained by using the following equations;

$$X_{ik}=X_{ik}/4.$$

Subsequently, the maximum element data $X_{iMAX}$ and the minimum element data $X_{iMIN}$ are respectively set to 0 and 255 in Step S215, and the data number i is incremented by 1 in Step S216. Then, it is judged whether the data number i is greater than the item number in Step S217. Thereby, the range $R_{ik}$ and the mean $X_{ik}$ are obtained for all the items.

Then, in Step S218, it is judged whether the number k is greater than 32. In the case where the number k is not greater than 32, this routine proceeds to Step S228 in which the data number i is set to 1. Thereafter, the sums of $X_{ik}$ and $R_{ik}$ are obtained in Step S229 by using the following equations respectively;

$$X_{iSUM}=X_{iSUM}+X_{ik}, \text{ and}$$

$$R_{iSUM}=R_{iSUM}+R_{ik}.$$

Then, the data number i is incremented by 1 in Step S230 and it is judged whether the data number i is greater than the item number. In the case where the data number i is not greater than the item number, this routine returns to Step S229. On the contrary, in the case where the data number i is greater than the item number, the number k is incremented by 1 in Step S232. Consequently, this routine returns.

On the other hand, in the case where the number k is greater than 32in Step S218, this routine proceeds to Step S219 in which the data number i is set to 1. Then, in Step S220, the sums of $X_{ik}$ and $R_{ik}$ are obtained respectively by using the following equations;

$$X_{iSUM}=X_{iSUM}+X_{i33}-X_{i1}, \text{ and}$$

$$R_{iSUM}=R_{iSUM}+R_{i33}-R_{i1}$$

and a mean $X_i$ of 32 element data axid a mean $\overline{R}_i$ of 32 range are obtained respectively by using the following equations;

$$\overline{X}_i=X_{iSUM}/32, \text{ and}$$

$$\overline{R}_i=R_{iSUM}/3.$$

Subsequently, the number l is set to 1 in Step S221 and, in Step S222, $X_{il}$ and $R_{il}$ are set respectively to $X_{il+1}$ and $R_{il+1}$. Then, the number l is incremented by 1 in Step S223 and it is judged whether the number l is greater than 32 in Step S224. In the case where the number l is not greater than 32, this routine returns to Step S222. On the contrary, in the case where the number l is greater than 32 in Step S224, $X_{i33}$ is set to 0 in Step S225. Then, the data number i is incremented by 1 in Step S226. Consequently, it is judged whether the data number i is greater than the item number. In the case where the data number i is greater than the item number, the element data receiving/data processing routine returns to the main routine.

Since element data used to obtain the means $\overline{X}_i$ and $\overline{R}_i$ are latest received 32 $X_{ik}$ and 32 $R_{ik}$, the oldest element data $X_{il}$ and $R_{il}$ are discarded and the remaining element data are sequentially forwarded by 1 each time the new $X_{i33}$ and $R_{i33}$ are transmitted. The means $\overline{X}_i$ and $\overline{R}_i$ are calculated for all the items. In other word, the means $X_{ik}$ and the range $R_{ik}$ are obtained each time four cycles of copying operation are completed for each kind of element data. Each time 32 mean values of each of $X_{ik}$ and $R_{ik}$ are obtained, that is, each time 128 cycles of copying operation are completed, the mean values $\overline{X}_i$ and $\overline{R}_i$ are obtained. Thereafter, each time four cycles of copying operation are comnpieted, new mean value $X_{ik}$ and mean range $R_{ik}$ are calculated with the use of a moving ave rage method.

Further, when the SRAM 24 is initialized in Step S100 of the initialization processing routine, $X_{iMAX}$, $X_{iMIN}$, $X_{iSUM}$, $Rl_{iSUM}$, $X_{ik}$, $R_{ik}$, j, k are set to 0, 255, 0, 0, 0, 0, 1, 1, respectively.

Figure 10:
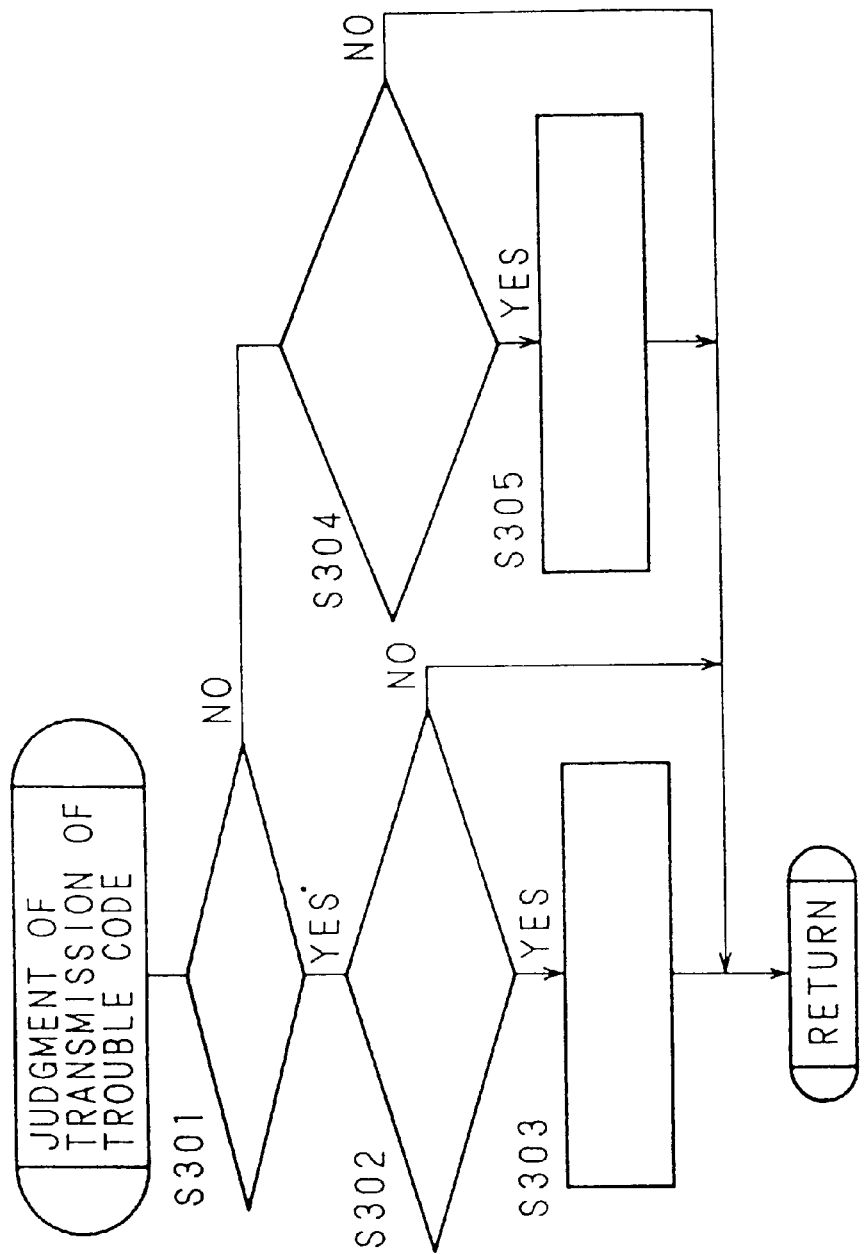
FIG. 10 is a flow chart showing procedure in a trouble transmission judging processing routine of the data terminal device.

FIG. 10 is a flow chart showing procedure of the trouble transmission judgment processing routine executed in Step S6.

First, it i s judged whether a trouble flag is set to 0 in Step S301. In the case where the trouble flange is set to 0, the on-edge of a bit $b_6$ of the JAM trouble code 72 is judged in step 302. In the case where the on-edge of the bit $b_6$ of the JAM trouble code 72 is detected, it means that some sort of trouble has arisen, the trouble flag and the trouble transmission flag are both set to 1 in Step S303.

In the case where the troub le flag is set to 0, it means that the copying machine is in normal condition. On the other hand, in the case where the trouble flag is set to 1, it means that the copying machine 1 is in troubled state. In the case where the trouble transmission flag is set to 1, the copying machine is in a state which should be reported to the central unit 3 by transmitting the data.

In the case where the trouble flag is already set to 1 in Step S301, i.e., the copying machine 1 is already in trouble condition in Step S301, the off-edge of bit $b_6$ of JAM trouble code 72 and of the least significant bit $b_0$ of the discharge code 71 are judged in Step S304. Thereby, it is detected that discharging of a sheet of copy paper from the copying machine 1 is detected after a reset switch, not shown, disposed on the main body of the copying machine 1 is actuated after recovery from the trouble. When it is detected that the sheet of copy paper is discharged from the copying machine 1, the trouble flag and a trouble recovery transmission flag are set to 0 and 1 respectively in step S305, and the trouble transmission processing routine returns to the main routine. In the case where the trouble recovery transmission flag is set to 1, it should be reported to the central unit 3 by transmitting the data that the copying machine 1 has recovered from the trouble. The trouble recovery transmission flag and the trouble transmission flag are reset to 0 after the trouble code is actually transmitted to the central unit 3.

Figure 11:
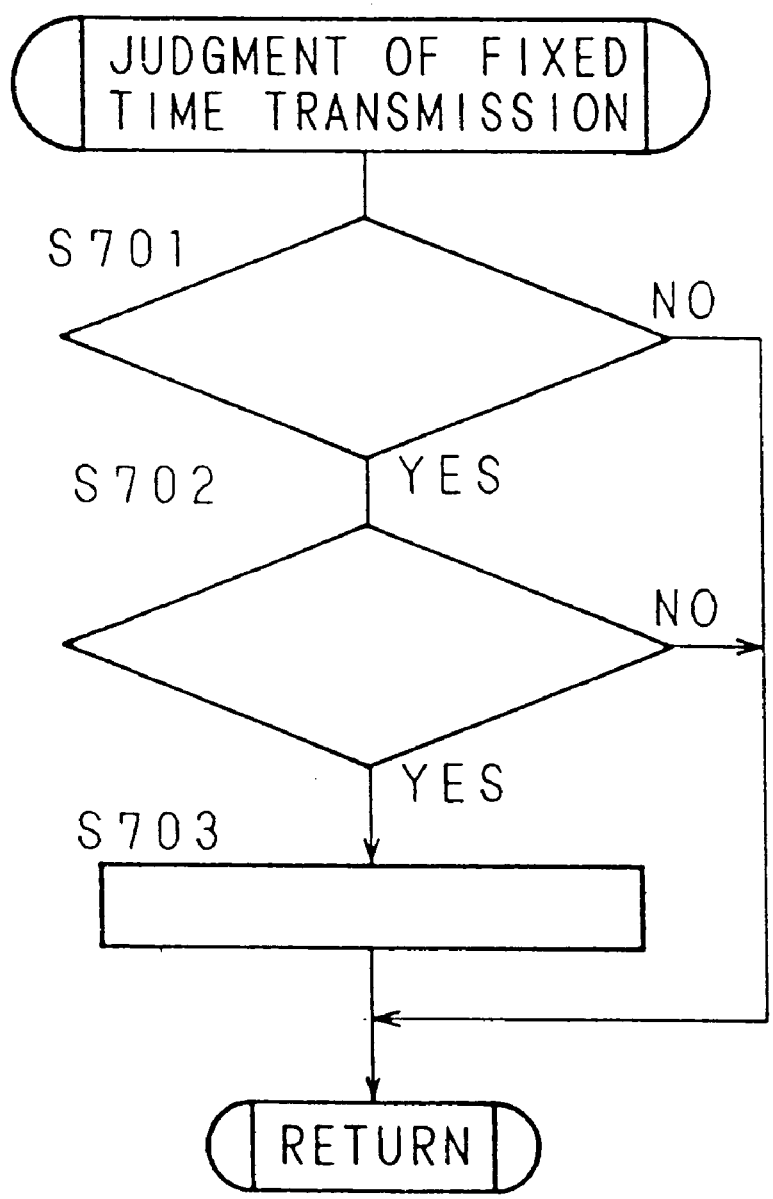
FIG. 11 is a flow chart showing contents of a fixed time transmission judging processing routine of the data terminal device.

FIG. 11 is a flow chart showing contents of the fixed time transmission judgment processing routine executed in Step S7.

First, it is judged whether a fixed time transmission flag is set to 0 in Step S701. In the case where the fixed time transmission flag is set to 1, it means that the fixed transmission time has already passed the present time. In other words, the data should be transmitted to the central unit 3. Accordingly, the maximum time transmission judgment processing routine directly returns to the main routine. On the other hand, in the case where the fixed time transmission flag is set to 0, it is judged whether the fixed transmission time has already passed the present time in Step S702. In the case where already passed, the fixed time transmission flag is set to 1 in step S703, and this routine returns to the main routine.

The fixed time transmission flag is reset to 0 after the data is actually transmitted to the central unit 3. Subsequently, the central unit 3 transmits a new fixed transmission time, which is set in the data terminal device 2.

In addition, even in the case where the power supply for the data terminal device 2 is shut off at the fixed transmission time, the SRAM 24 and the timer IC 25 are in operation since being backed up by the back-up power source. Accordingly, as soon as the power is supplied to the data terminal device 2, the fixed time transmission flag is set to 1 in Step S703 in the case where the fixed transmission time has not passed yet in Step S702. Simultaneously, the data is transmitted to the central unit 3 at the fixed transmission time.

It should be noted that, in the case where the power supply for the data terminal device 2 is shut off, copying operation of the copying machine 1 is not permitted. Therefore, various counter values are not to be renewed.

Figure 12A:
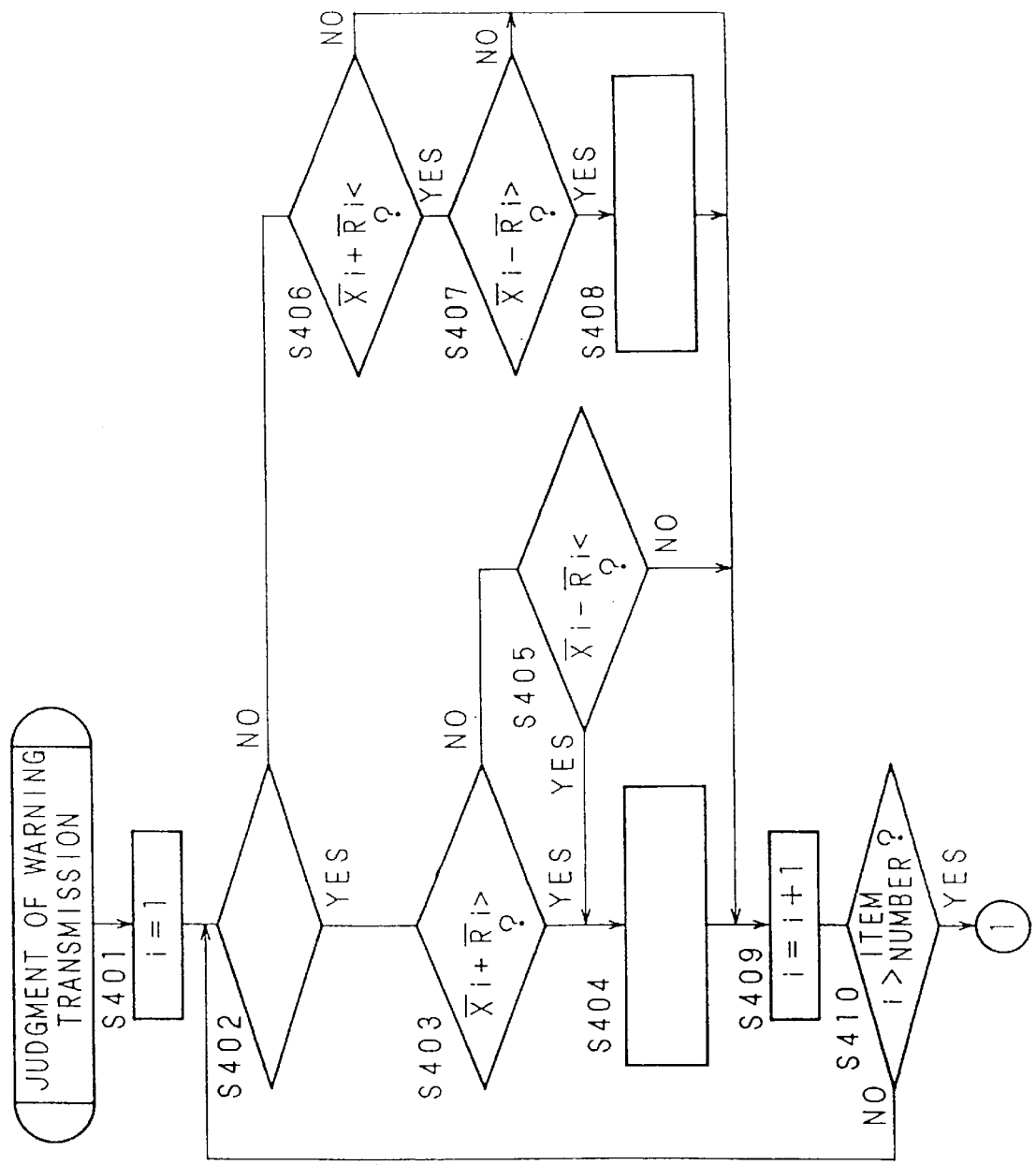
FIGS. 12(a) and 12(b), is a flow chart showing procedure in a warring transmission judging processing routine of the data terminal device.
Figure 12B:
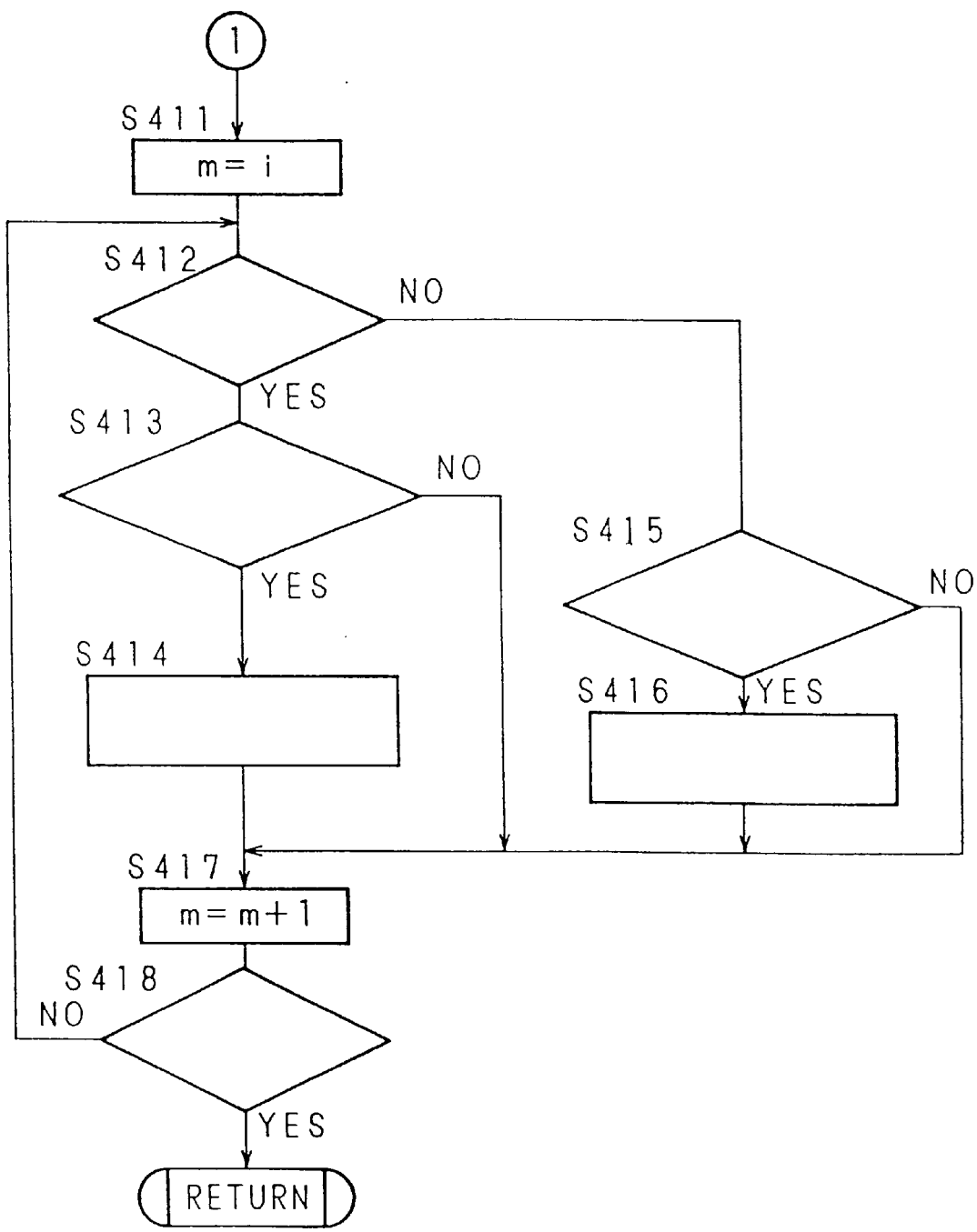

FIG. 12 is a flow chart showing procedure of the warning transmission judging processing routine executed in Step 58.

In this routine, judgment of all the element data, JAM trouble counter 73 and PM counter 75.

First, the threshold of the element data is determined in Steps S401 and S410. Then the threshold of the count values are determined in Steps S411 to S418. In the case where any one of the counter values exceeds the threshold thereof, the warning transmission flag is set to 1 indicating that condition of the copying machine 1 should be reported to the central unit 32 by transmitting the data.

First, the data number i is set to 1 in step S401. Subsequently, it is judged whether the warming flag$_i$ is set to 0 in Step S402, i.e., the element data is within its characteristic tolerance (hereinafter it is referred to as normal that the element data is within its tolerance). In the case where the element data is normal, the mean value $\overline{X}_i$ and the mean range $\overline{R}_i$ are added and it is judged whether the added value $\overline{X}_i+\overline{R}_i$ is greater than the upper limit threshold $_iU$ in Step S403. In the case where the added value $\overline{X}_i+\overline{R}_i$ is not greater than the upper limit threshold $_iU$, the mean range $\overline{R}_i$ is subtracted from the mean value $\overline{X}_i$, and it is judged whether the resultant value is smaller than the lower limit threshold $_iL$ in Step S405.

In the case where the added value $\overline{X}_i+\overline{R}_i$ is greater than the upper limit threshold $_iU$ in Step S403, or in the case where the value $\overline{X}_i-\overline{R}_i$ is smaller than the lower limit threshold in Step S405, the element data is judged riot to be normal. Accordingly, the warning flag and the warning transmission flag are respectively set to 1 in Step 404. Thereafter, the data number i is incremented by 1 in Step S409, and it is judged whether the data number i is greater than the item number in Step 410. In other words, it is judged whether judgment of threshold has been completed for all the element data.

On the other hand, in the case where the result of Step 403 is not greater than the upper limit threshold $_iU$, this routine returns to Step S402 from which the sequence of Steps S402 to S410 is repeated for the subsequent element data to be determined until the data number i become greater than the item number in Step S410. Then, this routine proceeds to Step S411.

Also, in the case where the element data is judged to be normal (NO in Step) S405), the warning flag$_i$ and the warning transmission flag remain in the current states thereof and the warning transmission judging routine proceeds to Step 409.

On the other hand, in the case where the warning flag$_i$ is already set to 1 in Step 402, i.e., the element data whose data number is i is judged not to be normal, thereby a warning being given, it is judged whether the above element data has returned to its normal condition in Steps S406 and S407. Specifically, it is judged whether the added value $\overline{X}_i+\overline{R}_i$ is smaller than the upper limit threshold $_iU$ in Step S406 and greater than the lower limit threshold $_iL$ in Step S407. As a result of the above judgment, in the case where the element data has returned to its normal condition, the warning flag$_i$ is reset to 0 and the warning recovery transmission flag is set to 1 in Step 408. The above two flags are reset to 0 after the element data is actually transmitted to the central unit 3.

When judgment of threshold for all the element data are completed in Step S410, judgments of threshold for JAM trouble counter 73 and PM counter 75 are executed in the subsequent Steps. Here, a data number m is given as serial number being from the element data for convenience in Step S411. Accordingly, the minimum of data number m is equal to the item number of the element data plus 1. The maximum of the data number m is equal to a sum of the item numbers of the element data, JAM trouble counter 73, and PM counter 75.

In Step S412, it is judged whether the warning flag m is set to 0, i.e., whether the counter value$_m$ normal. In the case where the counter value$_m$ is normal, it is judged whether the counter value$_m$ exceeds the upper limit threshold $_mU$ in Step S413. In the case where the counter value$_m$ exceeds the upper limit threshold m$_U$, it is judged that the counter value$_m$ is not normal, and both the warning flag m and the warning transmission flag are set to 1 in Step 414, and then the data number m is incremented by 1 in Step 417.

Further, in Step S418, it is judged whether the data number m is greater than a sum of all the item number. In other words, it is judged whether judgments of threshold for all the items of the JAM trouble counter 73 and PM counter 75 has been completed. In the case where the judgments have not been completed, the warning transmission judging routine returns to Step S412 to repeat the sequence of Steps S412 to S417 until the threshold for all the items of JAM trouble counter 73 and PM counter 75 are determined. In the case where, on the other hand, all the judgments have been completed in Step 418, this routine returns to the main routine. Also, in the case where the counter value$_m$ is not greater than the upper limit threshold $_m$U, i.e., the counter value$_m$ is normal (NO in Step S413), this routine proceeds directly to Step S417 with the warning flag$_m$ and warning transmission flag remaining at their states. On the contrary, in the case where the warning flag is already set to 1 in Step S412, and in the case where such a warning has already been given that the counter value$_m$ is not normal, it is judged whether the count value$_m$ has returned to its normal state in Step S415. In the case where the count value$_m$ has returned to its normal state, the warning flag$_m$ and the warning transmission flag are set to 0 and 1 respectively in Step S416. The above two flags are reset to 0 after the count data is actually transmitted to the central unit 3.

Figure 13:
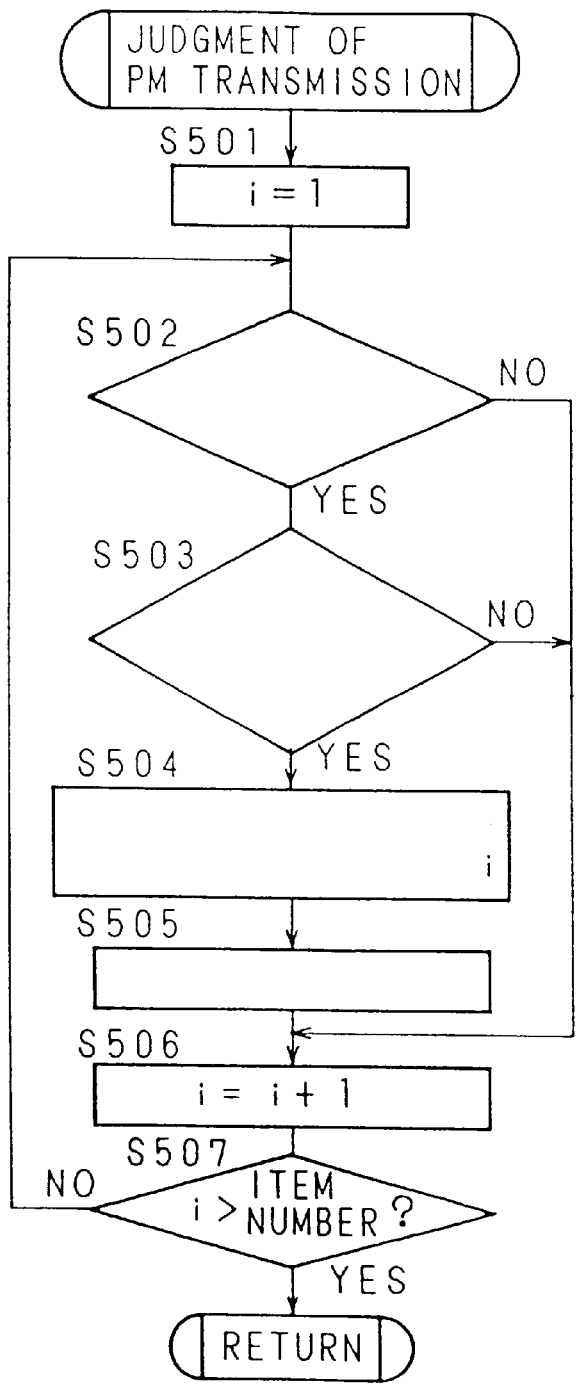
FIG. 13 is a flow chart showing procedure in a PM transmission judging processing routine of the data terminal device.

FIG. 13 is a flow chart showing procedure of the PM transmission judging processing routine executed in Step 10.

As described above, the PM counter 75 is an enabling counter for each parts of the copying machine 1, and is reset to 0 when a maintenance person replaces the part.

First, a counter variable i is set to 1 in Step 501 and it is judged whether the PM counter value i is set to 0 in Step S502. Subsequently, it is judged whether the preceding PM counter value i of the PM counter is not set to 0 in Step S503. In the case where the PM counter value i is set to 0 in Step 502 and the preceding PM counter value i is not set to 0 in Step S503, and when it is judged that the PM counter i is set to 0 this time, the preceding PM counter value i is held as a clear value i in Step S504. Then, the PM transmission flag is set to 1 in Step S505.

The PM transmission flag is reset to 0 when the counter value i and the clear value i are actually transmitted to the central unit 3. The clear value i is provided for the purpose of holding the counter value when the part is replaced.

Next, the variable i is incremented by 1 in Step S506, then it is judged whether all the PH counter values have been judged as described above in Step 507. In the case where there remain other PM counters i to be determined, the PM transmission judging routine, returns to Step S502 to repeat the sequence of Steps S502 to S506 until all the PM counter values are determined. When all the judgments have been completed, this routine returns to the main routine.

Figure 14:
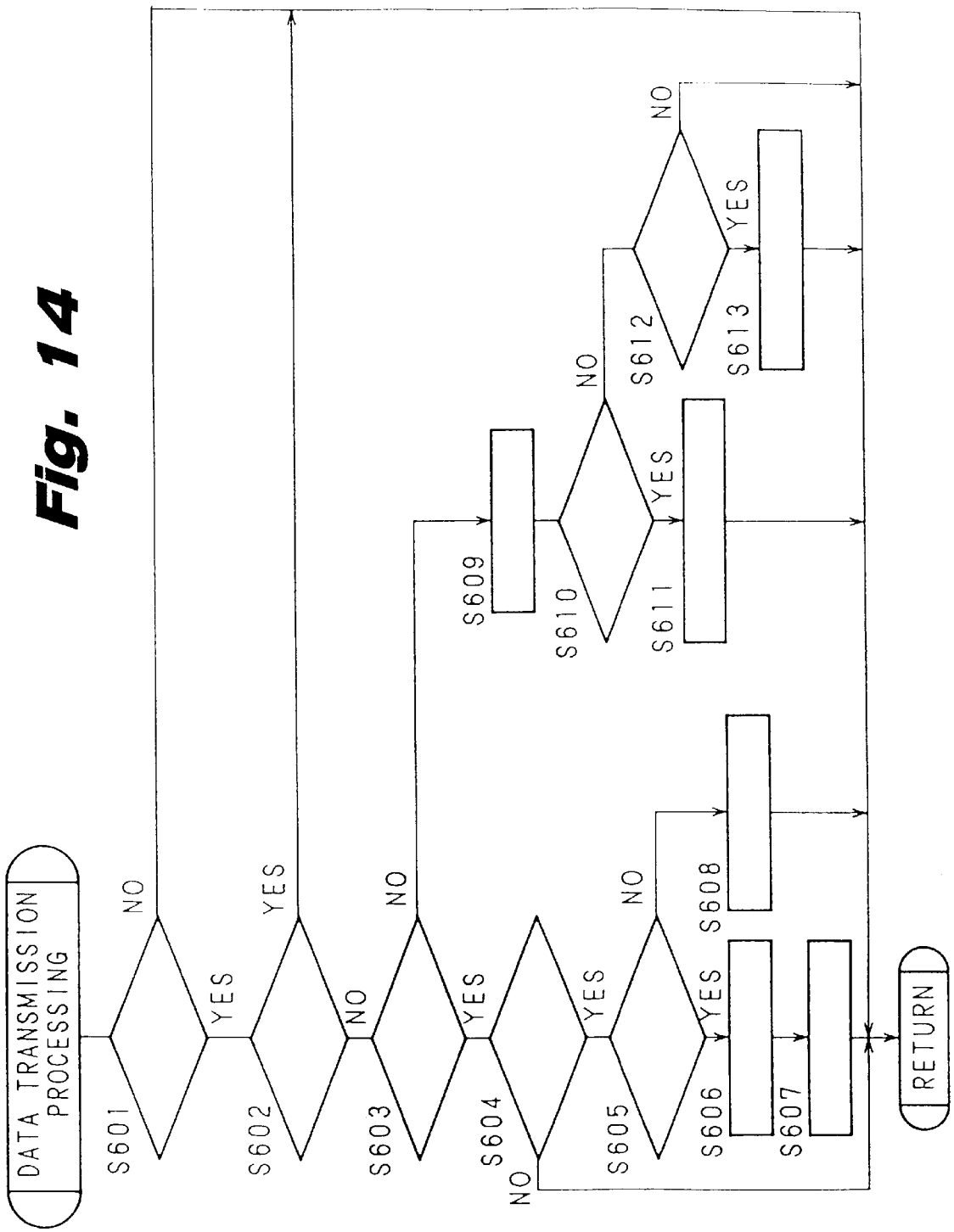
FIG. 14 is a flow chart showing procedure in a data transmission processing routine of the data terminal device.

FIG. 14 is a flow chart showing procedure of the data transmission processing routine executed in Step S11.

First, in Step 601, it is judged whether any of the transmission flag of the trouble, fixed time, warning, manual, and PM transmission flags are set to 1. In the case where any one of the above 5 flags is set to 1 and in the case where there is no need to wait to redial in Step S602, communication operation is effected through the modem 28 between the data terminal device 2 and the central unit 3 in the subsequently steps.

In Step S603, it is judged whether the data terminal device 2 and the central unit 3 are already in communication with each other through the communication line. In the case where the data terminal device 2 and the central unit 3 are already in communication with each other, and the modem 28 is ready, the data is transmitted to the central unit 3 until all the data transmission is completed in Step S608.

The transmitted data consist of each counter value of JAM trouble code 72, JAM trouble counter 73, counter 74 provided for each size of copy paper, and PM counter 75, the clear value of the PM counter 75 and element data (X, R).

Upon completion of the data transmission, each transmission flag is reset to 0 in Step S606, and then the communication line is disconnected in Step 607. In the case where it is determined that the communication line is not connected in Step S603, this routine proceeds to Step S609 to dial.

Next, in Step S610, it is judged whether or not the telephone connected to the data terminal device 2, from which the data is transmitted, is engaged. In the case where the telephone is not engaged, it is judged whether or not the telephone provided for the central unit 3, to which the data is transmitted, is engaged in Step S612. In the case where either one of the above two telephones is engaged, a redialing time is set in Steps S611, S613. When such processings as described above are completed, the data transmission processing routine returns to the main routine.

Next, there will be described operation in the central unit 3.

Figure 15:
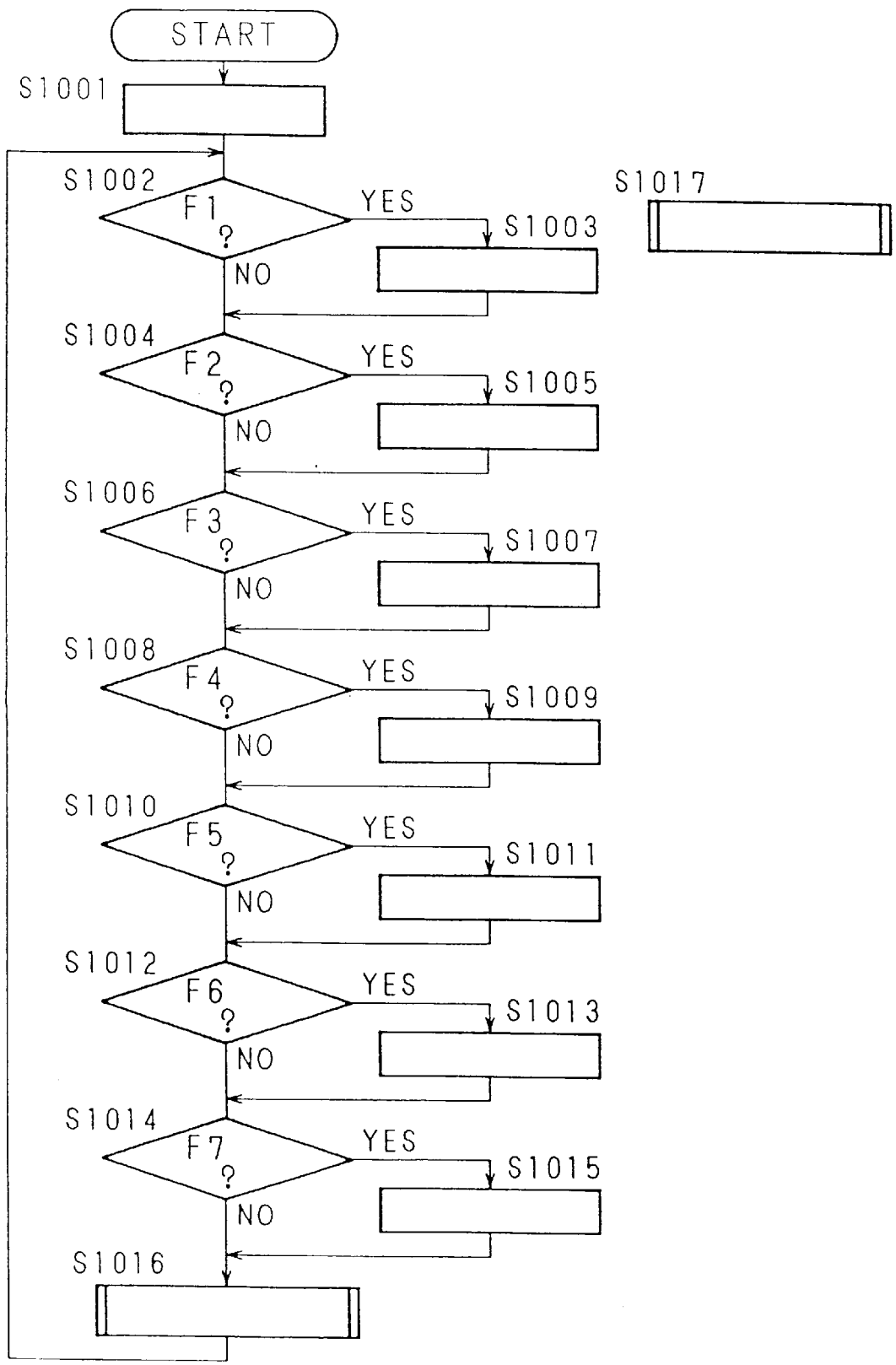
FIG. 15 is a flow chart showing operational procedure in a main routine of a central unit.

FIG. 15 is a flow chart showing operational procedure of the main routine of the central unit 3.

First, the central unit 3 sets environment including operational conditions of the modem 35, the printer 36 or the like in Step S1001. Then, the central unit 3 determines which function key(s) is selected by the operator in Steps S1002 to S1014. The operator can select the desired function key from the function keys F1 through F7 by keyed input. The central unit 3 performs processing corresponding to each of the selected function keys. Thereafter the central units 3 performs the fixed transmission time supervisory processing in Step S1016, and repeats the process of the Steps S1002 to S1016.

In the case where a function key F1 is selected in Step S1002, a model registration processing is performed in Step S1003. In this operation, model of the copying machine, item number, name and standard threshold of the element data, and each counter standard threshold are registered with the use of keys.

In the case where a function key F2 is selected in Step S1004, a user master input processing is performed in Step S1005. In this operation, a user's name, address, telephone number, model name, model number, transmission time and the like of the copying machine 1 are registered with the use of keys. In addition, an ID number of the data terminal device 2 is automatically numbered.

In the case where a function key F3 is selected in Step S1006, a trouble condition display processing is executed in Step S1007. In this operation, user information including a user's name, address, telephone number, and a model of the copying machine 1 currently in trouble condition, and the time when the trouble arose are displayed together with content of troubles. On one portion of the screen is normally displayed the number of troubles. Also, the number of trouble is displayed on one portion of any type of screen.

In the case where a function key F4 is selected in Step S1008, a warning condition display processing is executed in Step S1009. In this operation, the user information of the copying machine 1 currently in warning condition is displayed together with content of the warning. In addition, the number of warnings is always displayed on one portion of the screen irrespective of the operation of the function key F4.

In the case where a function key F5 is selected in Step S1010, an unreceived condition display processing is executed in Step S1011. In this operation, the user information of the copying machine 1 registered as an unireceived information in the fixed transmission time supervisory processing in Step S1016 to be described below is displayed together with predetermined fixed transmission time. Also, on one portion of the screen is always displayed the number of the unreceived information.

FIG. 18 is a schematic diagram showing an example of a display screen of unreceived condition display. On the upper portion of the screen, there are displayed the numbers of unreceived informations and troubles. On the screen, two user informations are displayed, and scheduled fixed time transmission times are displayed on respective upper right corners.

In the case where a function key F6 is selected in Step S1012, a user information display processing is executed in Step S1013. In this operation, a particular user is selected, and information of the selected user is displayed. Further, in the case where a sub-menu is selected here, total counter, which is a sum of counters provided for each copy paper size, and counters provided for each copy paper size, JAM trouble counter, PM counter and element data are displayed month by month, or item by item.

In the case where a function key F7 is selected in Step S1014, a billing processing is executed in Step S1015. In this operation, a billing amount is calculated in accordance with the counter value of the total counter and the calculation formula, and a bill is issued.

Figure 16:
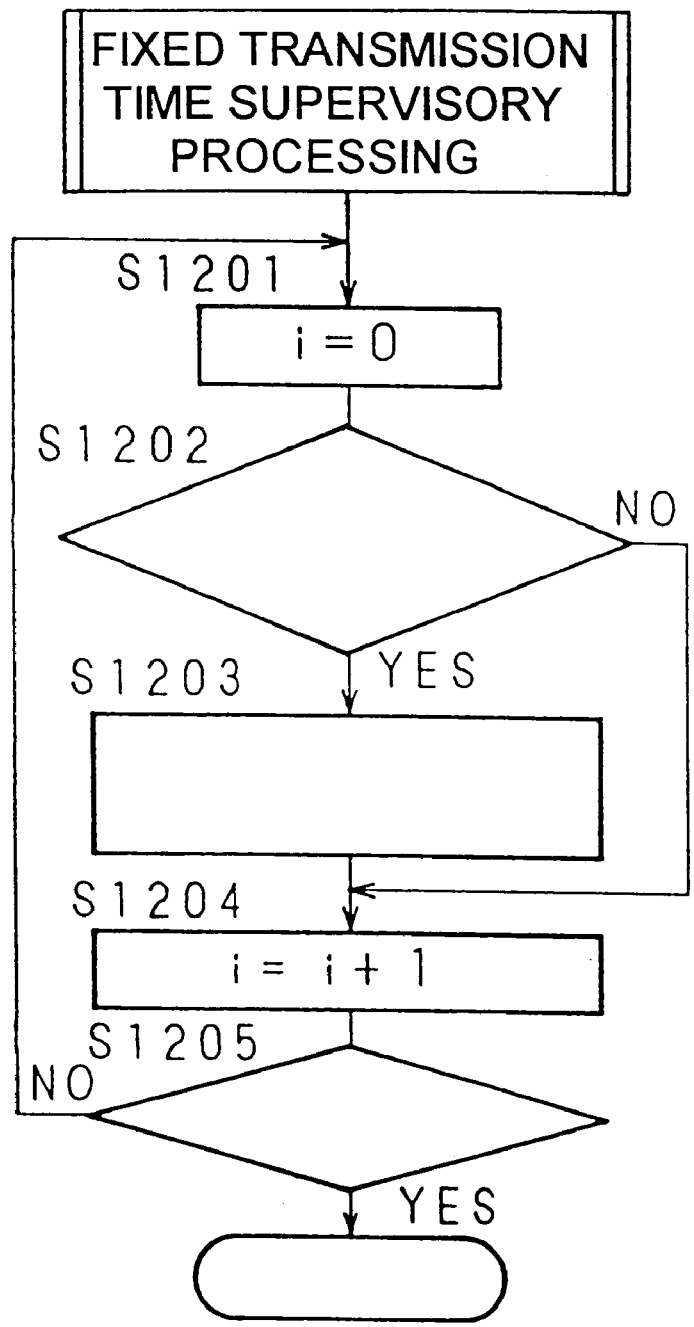
FIG. 16 is a flow chart showing procedure in a fixed time transmission supervisory processing routine of the center system.

FIG. 16 is a flow chart showing procedure of the fixed transmission time supervisory processing executed in Step S1016.

First, a terminal device number i is set to 0 in Step S1201. Then, it is judged whether the fixed transmission time of the data terminal device 2 has already passed the present time in Step S1202.

When one fixed time transmission is completed, a new fixed transmission time is set for the subsequent transmission. In view of this, as long as the fixed time transmission is normally executed, such a thing will not occur that the fixed transmission time has already passed the present time. Accordingly, in the case where the fixed transmission time has already passed the present time, it is judged that a communication trouble has occurred due to some sort of possible causes. As a result, the information on the copying machine 1 is registered in the storing unit 34 as unreceived information in Step S1203. Then, the terminal device number i is incremented by 1 in Step S1204. Consequently, in Step S1205, it is judged whether all the data terminal devices 2 have been supervised. In the case where all the data terminal devices 2 have been supervised, the routine returns to the main routine. In the case where there remains some more data terminal devices 2 to be supervised, i.e., the terminal device number i is not greater than the number of data terminal device 2, this routine returns to Step S1201 and repeats the sequence of Steps S1201 to S1204 until all the data are supervised. The unreceived information registered in this routine is displayed in the above explained unreceived condition display processing, enabling the early detection of trouble in the communication line 6 or abnormality in the data terminal device 2.

Further, after the environment is set in Step S1001, interrupt of the data receiving/processing from the data terminal device 2 through the RS-232C I/F 26 and the modems 28, 35 is enabled. Therefore, even while any operation of Steps S1002 to S1016 is in process, the data receiving processing in Step S1017 is always preferentially executed.

Figure 17:
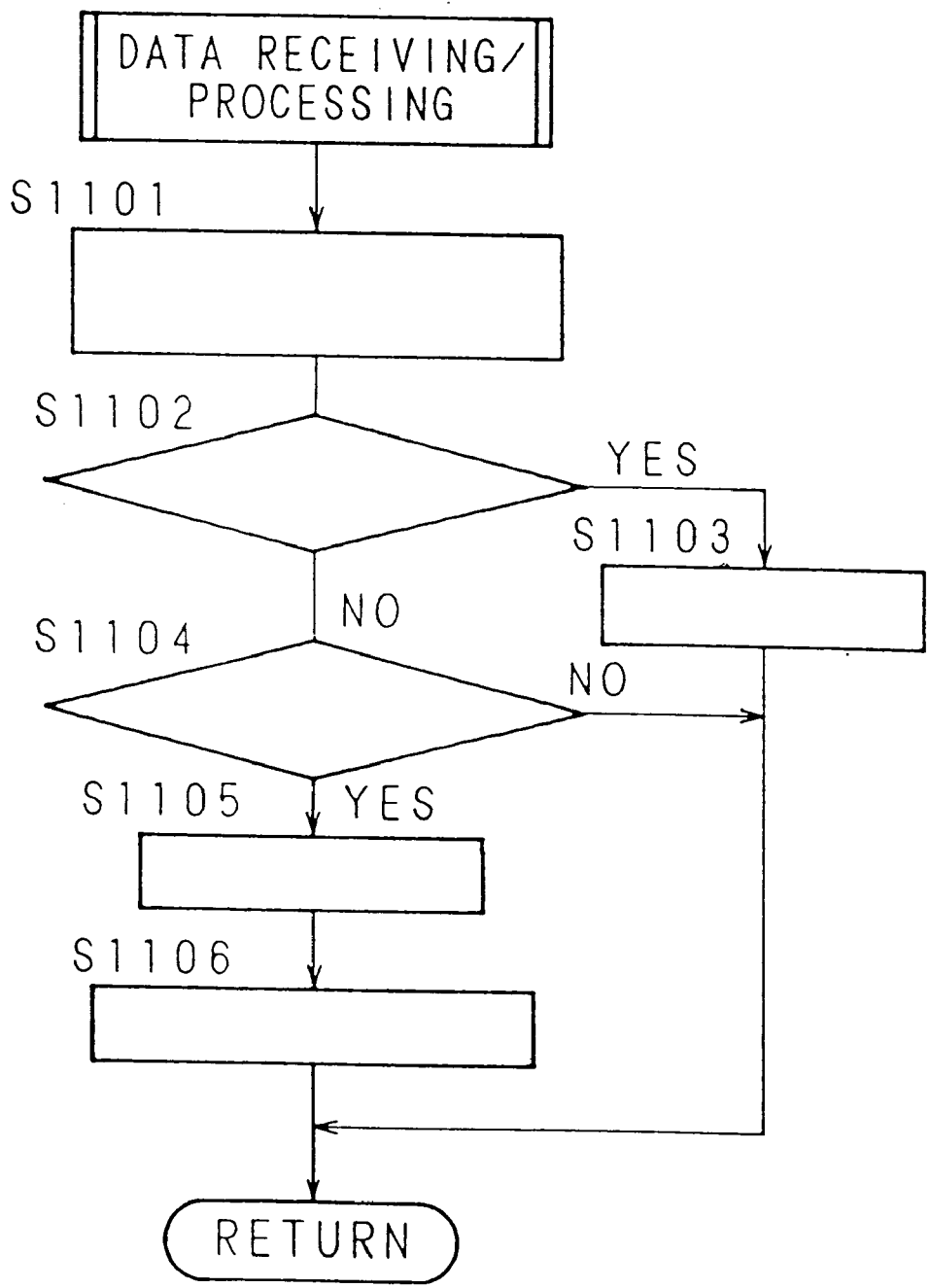
FIG. 17 is a flow chart showing procedure in a data receiving/processing routine.

FIG. 17 is a flow chart showing procedure of the data receiving/processing routine.

When the data is transmitted from each data terminal device 2 to the central unit 3, in which an interrupt request for receiving the data is generated, an ID number and each data in the data terminal device 2 are received in the predetermined order in Step S1101. Then, it is judged whether an error has occurred in receiving the data in Step S1102. In the case where the error has occurred, the data terminal device 2 is requested to transmit the data again in Step S1103. In the case where no error has occurred in Step S1102, this routine waits until the data transmission is completed in Step S1104, and the communication between the central unit 3 and the data terminal device 2 is shut off in Step S1105. Consequently, each transmitted data is totaled item by item, and month by month in Step S1106. In accordance with these data, the user's information is displayed and bills are issued.

Although the above embodiment is explained using the copying machine as a terminal device, it will be appreciated that the present invention is applicable to any device or apparatus which requires field service, such as an automatic vendor.

In addition, although a fixed transmission time is transmitted from the central unit to the data terminal device each time the fixed time transmission from the data terminal device to the central unit is completed in the above embodiment, the present invention is not limited to this. It may be appropriate that a fixed transmission time is pre-stored in a ROM provided in the data terminal device or preset by dialing.

As described above, according to the present invention, a fixed data transmission time for the terminal device is always supervised by controlling means. The present invention is so constructed as to display identification information of a communication device provided for the terminal device in the case where the controlling means has not received the information despite the fact that the fixed transmission time has already passed the present time. Accordingly, the controlling means can identify the terminal device which has not transmitted the data even past the fixed transmission time, thereby enabling early detection of abnormality in the communication device or communication line.

Further, clocking means for clocking the present time and storing means for storing the information to be transmitted at transmission time, both means being disposed in the communication device of the terminal device, are backed up by a back-up power source. Accordingly, when the power is supplied after being shut off, the backed up present time is compared with the fixed transmission time. In the case where the fixed transmission time has already passed the present time, the information which should have been transmitted at the fixed transmission time is read out of the storing means, and transmitted to the controlling means. Since provided with the above two means, the terminal device can assuredly transmit the information which should have been transmitted at the fixed transmission time when the power is supplied again thereto, even in the case where the power supply of the terminal device is shut off at the transmission time. Therefore, the controlling means can assuredly collect the information which should halve been received at the fixed transmission time, thereby reinforcing controlling function thereof.

Further, in the case where an image forming apparatus has had a trouble, it is determined that the image forming apparatus has recovered from its trouble condition to its normal condition by detecting that a sheet of paper is discharged therefrom. Accordingly, such likelihood can be eliminated as to report recovery from the trouble to the central unit many times for the same trouble as opposed to the conventional recovery judgment implemented by, for example, actuating a reset button. Hence, only the accurate information is transmitted to the central unit.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A centralized control system, comprising:

at least one or more terminal device;

communicating means, provided for each of said at least one terminal device, for transmitting information relating to operational condition of each of said at least one terminal device at a predetermined time; and control means, connected to each of said communicating means through communication lines, for controlling each of said at least one terminal device in accordance with said information transmitted from each of said communicating means;

said control means having:

supervising means for supervising transmission of information at the predetermined time determined for each of said communicating means;

detecting means for detecting which of said communicating means has not normally transmitted the information at said predetermined time thereof based on a supervisory result of said supervising means; and display means for displaying information identifying the communicating means detected by said detecting means and information of said predetermined time.

2. A centralized control system as set forth in claim 1, wherein said at least one terminal device is an image forming apparatus.

3. A centralized control system as set forth in claim 2, wherein said image forming apparatus has counters provided for each paper size, and information relating to operational condition includes a number of image forming operation in accordance with each paper size.

\* \* \* \* \*